United States Patent
Narita et al.

(10) Patent No.: US 9,452,384 B2
(45) Date of Patent: Sep. 27, 2016

(54) ACIDIC GAS SEPARATION LAMINATE AND ACIDIC GAS SEPARATION MODULE PROVIDED WITH LAMINATE

(71) Applicant: FUJIFILM Corporation, Tokyo (JP)

(72) Inventors: Takeshi Narita, Ashigarakami-gun (JP); Kenichi Ishizuka, Ashigarakami-gun (KR); Ryo Ouchi, Ashigarakami-gun (JP); Makoto Sawada, Ashigarkami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/007,985

(22) Filed: Jan. 27, 2016

(65) Prior Publication Data

US 2016/0136572 A1     May 19, 2016

Related U.S. Application Data

(63) Continuation of application No. PCT/JP2014/003989, filed on Jul. 30, 2014.

(51) Int. Cl.
*B01D 53/22*     (2006.01)
*B01D 69/12*     (2006.01)

(52) U.S. Cl.
CPC .............. *B01D 53/228* (2013.01); *B01D 69/12* (2013.01); *B01D 2053/221* (2013.01); *B01D 2323/21* (2013.01); *B01D 2323/283* (2013.01); *B01D 2323/286* (2013.01); *B01D 2323/46* (2013.01)

(58) Field of Classification Search
CPC ........... B01D 53/228; B01D 2053/221; B01D 2323/21; B01D 2323/283; B01D 2323/286; B01D 2323/46; B01D 53/22; B01D 69/10; B01D 69/12
See application file for complete search history.

(56) References Cited

U.S. PATENT DOCUMENTS 2,266,367 A   *   12/1941   Hesser .................... G03C 7/18
                                                          430/257
3,695,964 A   *   10/1972   Shaines ................. B01D 63/06
                                                          156/161

(Continued)

FOREIGN PATENT DOCUMENTS

AU         6988691 A   *   7/1991  ............ B01D 63/10
JP          3-68428 A       3/1991

(Continued)

OTHER PUBLICATIONS

Machine translation of Nishimura et al. JP03068428A 25.03.1991, 7 pgs.*

(Continued)

*Primary Examiner* — Anthony Shumate
(74) *Attorney, Agent, or Firm* — Birch, Stewart, Kolasch & Birch, LLP

(57) ABSTRACT

An acidic gas separation laminate includes a composite film formed of a porous support which is formed by laminating a porous film and an auxiliary support film and an acidic gas separation facilitated transport film which is disposed on the porous film side of the porous support; a permeating gas channel member which is laminated so as to face the auxiliary support film of the porous support and in which acidic gas permeated and passed through the acidic gas separation facilitated transport film flows; and a film protection unit in which an adhesive becomes impregnated into the porous film at an impregnation rate of 10% or greater in the lamination direction of the porous support and the impregnation rate of the adhesive in the auxiliary support film is smaller than the impregnation rate of the adhesive in the porous film.

11 Claims, 13 Drawing Sheets

(56) References Cited

U.S. PATENT DOCUMENTS

| | | | | |
|---|---|---|---|---|
| 5,294,346 | A * | 3/1994 | Donato | B01D 69/12 210/645 |
| 5,409,515 | A * | 4/1995 | Yamamoto | B01D 39/163 55/341.1 |
| 6,086,729 | A * | 7/2000 | Bredesen | B01D 53/228 204/192.12 |
| 6,630,093 | B1 * | 10/2003 | Jones | B29C 70/088 264/136 |
| 6,998,193 | B2 * | 2/2006 | Sun | B01D 67/003 429/247 |
| 8,956,444 | B2 * | 2/2015 | Holliday | B81B 7/0058 96/11 |
| 2005/0077229 | A1 * | 4/2005 | Ishii | B01D 65/003 210/321.83 |
| 2005/0109609 | A1 * | 5/2005 | Rei | B01D 53/228 204/192.15 |
| 2012/0043272 | A1 * | 2/2012 | Yoshida | B01D 63/10 210/457 |
| 2013/0199370 | A1 * | 8/2013 | Okada | B01D 53/228 95/52 |
| 2014/0137740 | A1 | 5/2014 | Aburaya et al. | |
| 2014/0231332 | A1 * | 8/2014 | Hirozawa | B01D 63/10 210/321.83 |
| 2014/0260986 | A1 | 9/2014 | Ishizuka et al. | |
| 2014/0352540 | A1 | 12/2014 | Okada et al. | |
| 2015/0151244 | A1 | 6/2015 | Ishizuka | |
| 2015/0182917 | A1 * | 7/2015 | Hosoya | B01D 63/106 422/617 |
| 2015/0336056 | A1 | 11/2015 | Ouchi | |

FOREIGN PATENT DOCUMENTS

| | | |
|---|---|---|
| JP | 05131123 A * | 5/1993 |
| JP | 11-226366 A | 8/1999 |
| JP | 2009-18239 A | 1/2009 |
| WO | WO 2013/018538 A1 | 2/2013 |
| WO | WO 2013/018659 A1 | 2/2013 |
| WO | WO 2013/077418 A1 | 5/2013 |
| WO | WO 2013/191147 A1 | 12/2013 |
| WO | WO 2014/129098 A1 | 8/2014 |

OTHER PUBLICATIONS

Machine translation of JP2009018239A Jan. 29, 2009 9 pgs.*
Machine translation of JP11216341A Aug. 10, 1999 5 pgs.*
Machine translation of ISHII JP 05-131123 A 28.05.1993 9 pgs.*
International Search Report issued in PCT/JP2014/003989, dated Oct. 28 2014. 3 pgs.
Written Opinion of the International Searching Authority issued in PCT/JP2014/003989, dated Oct. 28, 2014. 7 pgs.

* cited by examiner

ACIDIC GAS SEPARATION LAMINATE AND ACIDIC GAS SEPARATION MODULE PROVIDED WITH LAMINATE

CROSS REFERENCE TO RELATED APPLICATIONS

The present application is a Continuation of PCT International Application No. PCT/JP2014/003989 filed on Jul. 30, 2014, which claims priority under 35 U.S.C. §119(a) to Japanese Patent Application No. 2013-157550 filed on Jul. 30, 2013 and Japanese Patent Application No. 2014-151934 filed on Jul. 25, 2014. Each of the above applications is hereby expressly incorporated by reference, in its entirety, into the present application.

BACKGROUND OF THE INVENTION

1. Field of the Invention

The present invention relates to an acidic gas separation laminate having an acidic gas separation function and an acidic gas separation module including the laminate.

2. Description of the Related Art

In recent years, a technique of selectively separating out acidic gas in mixed gas has been developed. For example, an acidic gas separation module that separates acidic gas from raw material gas using an acidic gas separation film which allow selective permeation of the acidic gas has been developed.

Separation films are roughly classified into so-called facilitated transport films in which acidic gas is transported to the opposite side of the film by a carrier in the separation film and so-called dissolution diffusion films which performs separation using a difference in solubility of acidic gas and a substance to be separated therefrom in a film and diffusibility in a film.

As a separation film module including such a separation film, film modules having various forms such as a spiral type, a flat film type, and a hollow fiber type are used. For example, JP1999-226366A (JP-H11-226366A) discloses a spiral type film module in which a separation film, a supply side channel member and a permeation side channel member are wound around a center pipe and JP1999-216341A (JP-H11-216341A) discloses a flat film type film module.

The spiral type film module is produced by alternately laminating a leaf, in which a supply side channel member is arranged between films obtained by folding a separation film into two, with a permeation side channel member, coating the three sides of a laminate peripheral portion, which is formed of the separation film and the permeation side channel member, with an adhesive to prepare a separation film unit so as to prevent a supply side fluid and a permeation side fluid from being mixed with each other; winding one or a plurality of the separation film units around a center pipe (fluid collecting pipe) in the form of a spiral, and trimming (end surface modifying process) end portions of an obtained cylindrical wound body.

The film type module is obtained by arranging a separation film on one surface or both surfaces of a permeation side channel member, also coating three sides of the laminate peripheral portion with an adhesive to prepare a separation film unit, and bonding one side which is not coated with the adhesive to a fluid collecting pipe.

In both modules, a sealing unit formed by an adhesive is extremely important from a viewpoint of preventing a supply side fluid and a permeation side fluid from being mixed with each other to increase separation performance.

Since the sealing performance is degraded when sealing precision resulting from the sealing unit is not sufficient, a sealing method with high precision and a filling rate or an adhesion width of an adhesive have been examined several times (JP2009-18239A, JP1991-68428A (JP-H03-68428A), and the like).

SUMMARY OF THE INVENTION

In a case where a substance to be separated is a gas, since gas leaks more frequently than a liquid at the time of an operation and acidic gas is separated from raw material gas containing water vapor in an acidic gas separation module which includes a facilitated transport film, the viscosity of a separation film (facilitated transport film) is decreased. Further, the pressure of the supply gas is greater than or equal to atmospheric pressure and thus a difference in pressure is generated between the supply gas side and the permeating gas side. Then, a difference in pressure is applied to the separation film whose viscosity is decreased. Further, since a sealing unit in which pores are filled with an adhesive and portions other than the sealing unit have mechanical strengths different from each other when the difference in pressure is applied, stress concentration is likely to occur in boundaries therebetween. Due to great stress being applied to the boundaries, defects are generated in the separation film.

In addition, as described above, in a case of a spiral type module, a leaf in which a supply fluid channel member is interposed between the separation film folded into two is used, but the folded portion of the separation film folded into two may be damaged (defects may be generated) in some cases.

Defects in the separation film allow a supply fluid and a permeating fluid to be mixed with each other and becomes a factor of degradation of separation performance.

An object of the present invention is to provide an acidic gas separation laminate which is capable of suppressing generation of defects in a separation film and is applied to an acidic gas separation module and to provide an acidic gas separation module which includes the laminate.

According to an aspect of the present invention, there is provided an acidic gas separation laminate including: a composite film formed of a porous support which is formed by laminating a porous film and an auxiliary support film, a carrier which is disposed on the porous film side of the porous support and reacts with acidic gas in raw material gas, and an acidic gas separation facilitated transport film which contains a hydrophilic compound carrying the carrier; a permeating gas channel member which is laminated so as to face the auxiliary support film of the porous support and in which acidic gas having permeated and passed though the acidic gas separation facilitated transport film flows; and a film protection unit in which an adhesive becomes impregnated into the porous film at an impregnation rate of 10% or greater in the lamination direction of the porous support and the impregnation rate of the adhesive in the auxiliary support film is smaller than the impregnation rate of the adhesive in the porous film.

Here, the "impregnation rate of an adhesive" indicates the filling rate of the adhesive with respect to gaps (pores) in each of the porous film, the auxiliary support film, and the gas channel member.

The impregnation rate of the adhesive is obtained by performing three field (three sections are cut out and one film protection unit for one section is observed) observation on the section on which the film protection unit of the laminate is formed after the adhesive is applied using a scanning electron microscope (SEM) or an optical microscope and acquiring the ratio of the area of the adhesive filled into pores to the area of pores of each film and members by carrying out image processing after the adhesive is applied.

It is preferable that the acidic gas separation laminate further includes a sealing unit which is formed by impregnating the porous film with the adhesive along the peripheral edge of the laminate at an impregnation rate of 60% or greater and impregnating the auxiliary support film and the permeating gas channel member with the adhesive such that the respective impregnation rates become greater than or equal to the impregnation rate of the adhesive in the porous film and the film protection unit is formed in a state of being adjacent to the sealing unit.

Here, the impregnation rate of the adhesive is acquired from the filling area of the adhesive with respect to the area of pores in the respective units of the porous film, the auxiliary support film, and the permeating gas channel member from the end portion of the laminate for each width of 0.01 mm, and a region in which the impregnation rate of the adhesive in the porous film is 60% or greater and in which the impregnation rate of the adhesive in the auxiliary support film is greater than the permeation rate of the porous film is specified as a sealing unit.

In the sealing unit, it is preferable that the impregnation rate of the adhesive in the auxiliary support film and the gas channel member is 80% or greater.

Further, the sealing unit does not need to be provided in the entire peripheral edge of the laminate and may be provided in the portion which needs to be sealed in the peripheral edge. Moreover, the width of the sealing unit may be non-uniform in the surface direction of the laminate, but it is desired that the width thereof be 5 mm or greater at all places.

It is preferable that the acidic gas separation laminate further includes a supply gas channel member which is disposed between the acidic gas separation facilitated transport films of the composite film that is obtained by inwardly folding the acidic gas separation facilitated transport film into two in the length direction, in which the film protection unit is formed on a portion overlapping the acidic gas separation facilitated transport film portion with which an end portion of the supply gas channel member is brought into contact, that is, on the folded portion of the composite film folded into two.

It is preferable that the porous film is formed of a fluorine-based resin material.

It is preferable that the porous film is formed of polytetrafluoroethylene.

It is preferable that the adhesive is formed of an epoxy resin.

It is preferable that the acidic gas separation laminate of the present invention further includes an intermediate layer between the porous film and the acidic gas separation facilitated transport film.

It is preferable that the intermediate layer is a silicone resin layer.

According to another aspect of the present invention, there is provided an acidic gas separation module including a permeating gas collecting pipe; and the acidic gas separation laminate of the present invention, in which the permeating gas channel member other than where the sealing unit of the acidic gas separation laminate is not formed is connected to the permeating gas collecting pipe.

The acidic gas separation module of the present invention may be a spiral type module or a flat film type module.

Since the acidic gas separation laminate of the present invention includes a film protection unit which is formed by an adhesive permeating into the porous film in contact with the facilitated transport film, a portion in which stress concentration occurs so that defects are easily generated in the facilitated transport film is protected and the generation of defects is suppressed, permeation of supply gas can be suppressed in a case where defects are generated when the acidic gas separation laminate is incorporated in the acidic gas separation module and used, and thus degradation of separation performance of a module can be suppressed.

DESCRIPTION OF THE PREFERRED EMBODIMENTS

Figure 1A:
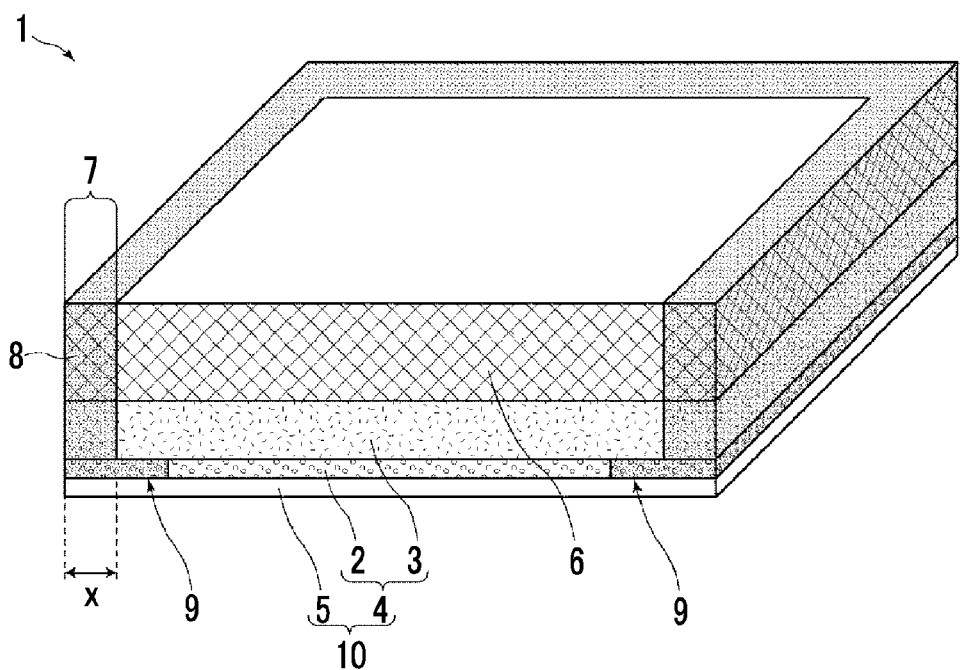
FIG. 1A is a perspective view schematically illustrating an acidic gas separation laminate according to an embodiment of the present invention.

Hereinafter, embodiments of the present invention will be described with reference to the accompanying drawings. Further, in the drawings described below, members (constituent elements) having the same or corresponding functions are denoted by the same reference numerals and the description thereof is appropriately omitted.

[Acidic Gas Separation Laminate]

Figure 1B:
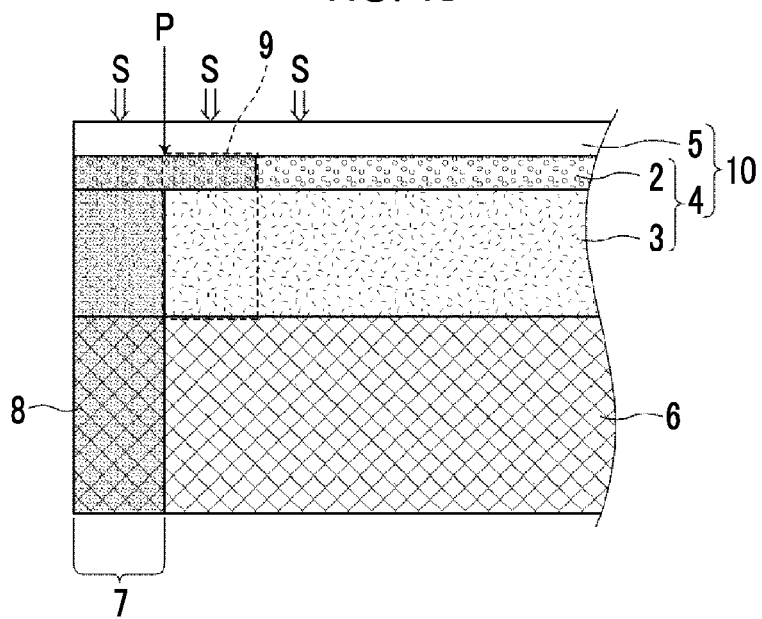
FIG. 1B is a view for describing effects of the acidic gas separation laminate of the present invention.

FIG. 1A is a perspective view schematically illustrating a lamination configuration of an acidic gas separation laminate 1 according to an embodiment of the present invention and FIG. 1B is an enlarged sectional view of the end portion of the laminate 1.

As illustrated in FIG. 1A, the acidic gas separation laminate 1 of the embodiment includes a gas separation composite film (hereinafter, gas separation film) 10 formed of a porous support 4 which is formed by laminating a porous film 2 and an auxiliary support film 3 and an acid gas separation facilitated transport film 5 which is disposed on the porous film 2 side of the porous support 4 and contains a carrier directly or indirectly reacting with acidic gas in raw material gas (supply gas) and a hydrophilic compound carrying the carrier, and a permeating gas channel member 6 which is disposed on the auxiliary support film 3 side of the porous support 4 and in which acidic gas permeating through the acid gas separation facilitated transport film 5 and the porous support 4 flows.

In addition, there is provided a sealing unit 7 and a film protection unit 9 in a state of being adjacent to the sealing unit 7 for the purpose of preventing inflow of gas to the porous support 4 and the permeating gas channel member 6 on three sides of the peripheral edge (four sides), except one side, of the rectangular laminate 1. The film protection unit 9 has a function of preventing generation of defects in the facilitated transport film 5 and suppressing leakage of supply gas to the permeating gas channel member 6 side in a case where defects are generated in the facilitated transport film 5.

The sealing unit 7 is a portion configured by an adhesive 8 having been impregnated into the porous support 4 and the channel member 6, and the adhesive 8 becomes impregnated into the porous film 2 of the porous support 4 at an impregnation rate of 60% or greater in the lamination direction and the adhesive 8 becomes impregnated into the auxiliary support film 3 and the channel member 6 at an impregnation rate greater than or equal to the impregnation rate of the adhesive in the porous film 2. It is preferable that a width x of the sealing unit 7 (hereinafter, the sealing width x) is 5 mm or greater from the end portion of the laminate 1.

When the sealing unit 7 can be formed over a region from the end portion of the laminate 1 at 5 mm or longer, the sealing function can be sufficiently ensured. Meanwhile, since the effective region for gas separation becomes narrower when the sealing width x becomes longer and the region of the sealing unit becomes larger, it is preferable that the sealing width x is not extremely long in a case where the sealing width x is 5 mm or greater. The sealing width x is preferably in a range of 5 mm to 70 mm and particularly preferably in a range of 10 mm to 50 mm.

Figure 1C:
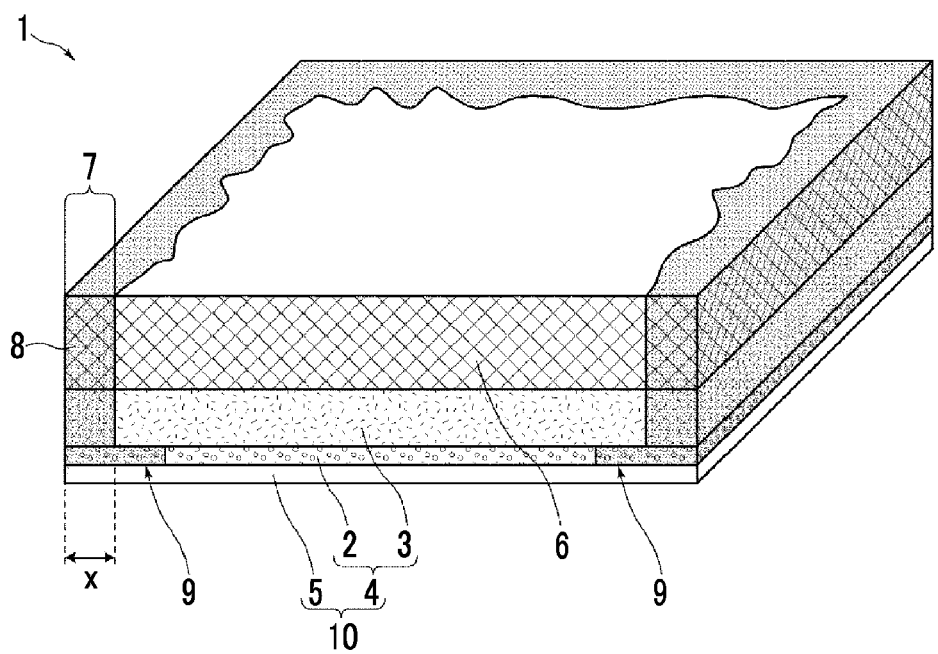
FIG. 1C is a view illustrating an example of the shape of a sealing unit of the acidic gas separation laminate of the present invention.
Figure 1D:
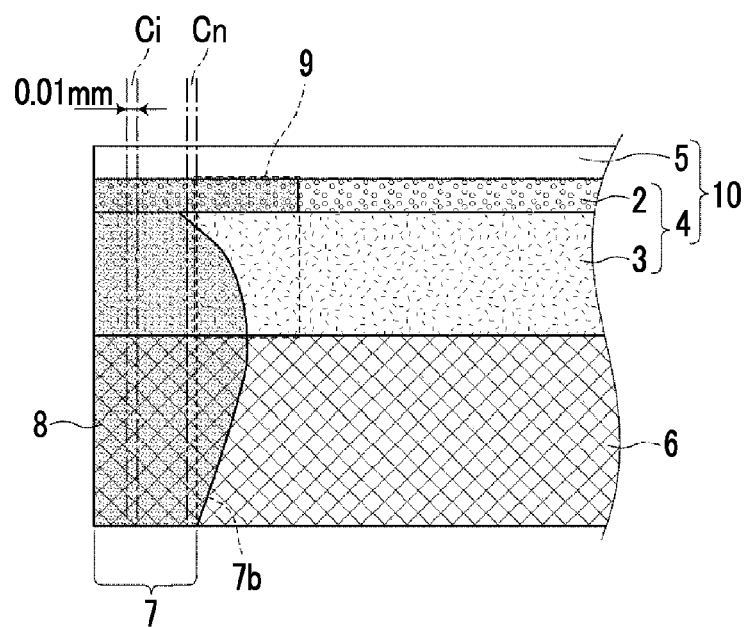
FIG. 1D is a view illustrating an example of the shape of the sealing unit and a stress buffer unit of the acidic gas separation laminate of the present invention.

Moreover, since the adhesive does not necessarily spread uniformly, as illustrated in the schematic view of FIG. 1C, the sealing width x of the sealing unit 7 may be different in each portion of the laminate 1 in the plane direction, and the smallest sealing width is preferably 5 mm or greater. In addition, as described above, a portion in which the impregnation rate of the adhesive in the porous film 2 from the end portion of the laminate 1 is 60% or greater and the impregnation rate of the adhesive in the auxiliary support film 3 and the channel member 6 is greater than or equal to the impregnation rate of the adhesive in the porous film 2 is specified as a sealing unit, but, as illustrated in FIG. 1D, there may be a portion (adhesive extension portion) which extends while the impregnation rate of the adhesive from the sealing unit to the inside of the laminate becoming gradually smaller than the impregnation rate of the adhesive in the sealing unit. In this case, the adhesive extension portion has an insufficient sealing function. Further, it is preferable that the adhesive extension portion is small because it has an adverse effect of inhibiting permeating gas transportation.

Moreover, the width of the film protection unit 9 may be different in each portion of the laminate in the plane direction similar to the sealing unit. The width of the film protection unit 9 is preferably 20 mm or greater and more preferably 40 mm or greater.

The film protection unit 9 surrounded by a dashed line in FIG. 1B is a region in which the adhesive becomes impregnated into the porous film 2 of the porous support 4 at an impregnation rate of 10% or greater and the impregnation rate of the adhesive in the auxiliary support film 3 is smaller than the impregnation rate of the adhesive in the porous film 2. Further, the impregnation rate of the adhesive in a region in which the permeating gas channel member 6 is laminated on the film protection unit 9 is smaller than the impregnation rate of the adhesive in the porous film 2.

In the film protection unit 9, the impregnation rate of the adhesive in the porous film 2 is preferably 10% or greater, more preferably 40% or greater, and still more preferably 60% or greater. In addition, the impregnation rate of the adhesive in the auxiliary support film 3 may be smaller than the impregnation rate of the adhesive in the porous film 2. The impregnation rate thereof is preferably as small as possible, more preferably less than 60%, still more preferably less than 40%, and even still more preferably less than 10%. The same applies to the impregnation rate of the adhesive in the region in which the permeating gas channel member 6 is laminated on the film protection unit 9.

In the example, the laminate 1 is rectangular and the sealing unit 7 and the film protection unit 9 are formed in the three sides of the peripheral edge except one side. Moreover, the shape of the laminate 1 and the region in which the sealing unit 7 and the film protection unit 9 are formed can be suitably set according to the configuration of a module to which the laminate is applied.

The laminate 1 is applied to a separation film module that separates acidic gas from raw material gas (supply gas) containing acidic gas and suitably used in a case where a supply gas contains water vapor. When the laminate 1 is applied to the separation film module, the viscosity of the facilitated transport film 5 is degraded by absorbing moisture. At this time, the facilitated transport film 5 is pressed to the porous film 2 side by a pressure S (differential pressure between the supply gas and the permeating gas) resulting from the supply gas and a mechanical strength (rigidity) of a region into which the adhesive of the laminate 1 becomes impregnated is different from a mechanical strength of a region into which the adhesive thereof has not become impregnated, and thus stress concentration occurs in the boundary between both regions and defects may occur in the facilitated transport film 5 at the boundary. The laminate 1 which is an embodiment of the present invention includes the film protection unit 9 in a state of being adjacent to the sealing unit 7 as illustrated in the enlarged view of FIG. 1B, and the occurrence of defects in the facilitated transport film 5 can be suppressed by the film protection unit 9 functioning as a buffer unit that alleviates stress concentration. When gas separation is performed by a module, a predetermined pressure S is normally applied to the facilitated transport film 5 from the supply gas side due to the pressure difference (differential pressure) between the supply gas and the permeating gas. At this time, since the rigidity of the porous support 4 varies due to the impregnation rate (including the presence or absence of permeation) of the adhesive, stress concentration occurs in the facilitated transport film 5 at a boundary position between regions whose rigidities are greatly different from each other, for example, a portion indicated by an arrow P in FIG. 1B. In a case where the film protection unit 9 does not exist, since the sealing unit 7 is adjacent to a region into which the adhesive has not become impregnated at all, the stress concentration becomes greater and defects are likely to occur in the facilitated transport film 5. However, since the rigidity can be gradually changed when the film protection unit 9 is included, the stress concentration can be alleviated.

Since a certain degree of stress concentration occurs in an interface P between the sealing unit 7 and the film protection unit 9 even when the film protection unit 9 is included, cracks are generated in the facilitated transport film 5 in some cases. However, since the adhesive has become impregnated into the porous film 2 in the film protection unit 9, it is possible to suppress passing of supply gas, which has permeated into the cracks of the facilitated transport film 5, into the permeating gas channel member 6 side. The effect of suppressing permeation of the supply gas into the permeating gas channel member side can be obtained when the impregnation rate of the adhesive in the porous film 2 is 10% or greater, the effect can be increased when the impregnation rate of the adhesive is 40% or greater, and the effect becomes significant when the impregnation rate of the adhesive is 60% or greater. Further, in the auxiliary support film 3 and the permeating gas channel member 6 of the film protection unit 9, the impregnation rate of the adhesive is preferably as small as possible.

Further, as illustrated in FIG. 1D, the impregnation rate of the adhesive is calculated by acquiring the ratio of an area into which the adhesive is filled to an area of pores of respective layers (the porous layer 2, the auxiliary support film 3, and the channel member 6) through image processing for each area having a width of 0.01 mm from the end portion in the section, for example, for each area $c_i$ having a width defined by dashed lines in FIG. 1D. In addition, the width of the sealing unit and the width of the film protection unit are acquired from the impregnation rate of the adhesive. The impregnation rate of the adhesive in the porous film for each region (hereinafter, a measurement unit region) having a width of 0.01 mm from the end portion is acquired, a region from the end portion to the farthest measurement unit region (region $c_n$ in FIG. 1D) in the measurement unit region in which a impregnation rate of the adhesive being 60% or greater in the porous film and a condition in which the impregnation rate of the adhesive in the auxiliary support film and the gas channel member is greater than or equal to the impregnation rate of the adhesive in the porous film are satisfied is set as the sealing unit 7, and the distance from the end portion of the laminate to an end 7b on a side distant from the laminate end portion of the measurement unit region $c_n$ is set as the width of the sealing unit 7. In addition, a region in which the impregnation rate in the porous film 2 is 10% or greater and the impregnation rate of the adhesive in the auxiliary support film 3 is smaller than the impregnation rate of the adhesive in the porous film 2 is the film protection unit 9. As illustrated in FIG. 1C, the impregnation region of the adhesive is greatly different for each position at which a sealing unit and the film protection unit are formed in the in-plane direction in many cases, and average values of values obtained from plural places (for example, three places) in the section are used as the width of the sealing unit and the width of the film protection unit.

<Gas Separation Film>

The gas separation film 10 includes the acidic gas separation facilitated transport film 5 and the porous support 4 which supports the facilitated transport film 5 and is provided on the side of the permeating gas channel member 6.

(Acidic Gas Separation Facilitated Transport Film)

The acidic gas separation facilitated transport film 5 contains at least a carrier directly or indirectly reacting with acidic gas in raw material gas and a hydrophilic compound carrying the carrier, and has a function of allowing the acidic gas to selectively permeate from the raw material gas.

Since the facilitated transport film 5 normally has more heat resistance than a dissolution diffusion film, the acidic gas can selectively permeate under a temperature condition of, for example, 100° C. to 200° C. Further, even when the raw material gas contains water vapor, a hydrophilic compound absorbs the water vapor such that the facilitated transport film containing the hydrophilic compound holds moisture and thus the carrier is easily transported. Therefore, the separation efficiency is increased compared to a case of using a dissolution diffusion film.

The film area of the facilitated transport film 5, which is not particularly limited, is preferably in a range of 0.01 m² to 1000 m², more preferably in a range of 0.02 m² to 750 m², and still more preferably in a range of 0.025 m² to 500 m². Further, from a practical viewpoint, the film area is preferably in a range of 1 m² to 100 m².

When the film area is set to be greater than or equal to each lower limit, the acidic gas can be separated out efficiently with respect to the film area. In addition, when the film area is set to be less than or equal to each upper limit, the workability is improved.

The thickness of the facilitated transport film 5, which is not particularly limited, is preferably in a range of 1 μM to 200 μm and more preferably in a range of 2 μm to 175 μm. When the thickness is in the above-described range, the gas permeability and separation selectivity can be sufficiently realized, which is preferable.

(Hydrophilic Compound)

As the hydrophilic compound, a hydrophilic polymer is exemplified. The hydrophilic polymer functions as a binder and exhibits a function of holding water to allow separating out of acidic gas performed by an acidic gas carrier. It is preferable that the hydrophilic compound has high hydrophilicity and absorbs water whose mass is 5 times to 1000 times the mass of the hydrophilic compound itself from the viewpoint that the hydrophilic compound is capable of forming a coating solution by being dissolved in water or dispersed in water and an acidic gas separation layer has high hydrophilicity (moisture retaining property).

From viewpoints of hydrophilicity, film-forming properties, and strength, as the hydrophilic polymer, polyvinyl alcohol polyacrylate, a polyvinyl alcohol-polyacrylic acid (PVA-PAA) copolymer, polyvinyl alcohol, polyacrylic acid, polyacrylate, polyvinyl butyral, poly-N-vinylpyrrolidone, poly-N-vinylacetamide, or polyacrylamide is preferable and a PVA-PAA copolymer is particularly preferable. A PVA-PAA copolymer has high water absorption performance and high strength in a hydrogel state at the time of high water absorption. The percentage content of polyacrylate in the PVA-PAA copolymer is preferably in a range of 5% by mole to 95% by mole and more preferably in a range of 30% by mole to 70% by mole. Examples of the polyacrylate include alkali metal salts such as sodium salts or potassium salts, aluminum salts, and organic ammonium salts.

As a commercially available PVA-PAA copolymer, KURASTOMER AP20 (manufactured by KURARAY CO., LTD.) is exemplified.

(Acidic Gas Carrier)

The acidic gas carrier has affinity for acidic gas (for example, carbon dioxide) and is various kinds of water-soluble compound showing basicity. Further, the acidic gas carrier indirectly reacts with acidic gas or the carrier itself directly reacts with acidic gas. The expression "the carrier indirectly reacts with acidic gas" indicates that, for example, the carrier generates a basic compound by reacting with another gas contained in a supply gas and then the basic compound reacts with the acidic gas. As such an acidic gas carrier, specifically, an alkali metal or an alkali metal compound which is capable of selectively taking $CO_2$ into a film by being brought into contact with steam (water vapor) to release $OH^-$ and by $OH^-$ reacting with $CO_2$ is exemplified.

Moreover, as the acidic gas carrier directly reacting with acidic gas, a nitrogen-containing compound or a sulfur oxide, which has basicity, may be exemplified.

Regarding alkali metal compounds, an aqueous solution obtained by adding a multidentate ligand forming a complex with an alkali metal ion to an aqueous solution containing at least one selected from a group consisting of alkali metal carbonates, alkali metal bicarbonates, and alkali metal hydroxides is exemplified.

In addition, in the specification, an alkali metal or an alkali metal compound is used with the meaning of including the salts thereof and the ions thereof.

Examples of the alkali metal carbonate include lithium carbonate, sodium carbonate, potassium carbonate, rubidium carbonate, and cesium carbonate. Examples of the alkali metal bicarbonate include lithium hydrogencarbonate, sodium hydrogencarbonate, potassium hydrogencarbonate, rubidium hydrogencarbonate, and rubidium hydrogencarbonate.

Examples of the alkali metal hydroxide include lithium hydroxide, sodium hydroxide, potassium hydroxide, rubidium hydroxide, and cesium hydroxide.

Among these, alkali metal carbonates are preferable and a compound containing potassium, rubidium, and cesium, which have high solubility in water, as alkali metal elements is preferable from a viewpoint that affinity for acidic gas is excellent.

In the embodiment, since a hygroscopic facilitated transport film is used, a phenomenon (blocking) in which the facilitated transport film enters a gel state due to the absorbed moisture at the time of production and then the facilitated transport film adheres to another film or another member at the time of production easily occurs. In a case where blocking occurs, defects occur in the facilitated transport film due to the adhesion when the facilitated transport film is peeled off from another film or another member and, as a result, gas leakage may occur. Therefore, in the embodiment, it is preferable to attempt to prevent this blocking.

Here, in the embodiment, it is preferable that a carrier contains two or more kinds of alkali metal compound. When the carrier contains two or more kinds of alkali metal compound, the same kind of carrier in a film can be separated to a distant place so that non-uniformity in blocking is generated and thus the blocking can be prevented.

Moreover, it is more preferable that a carrier contains a first alkali metal compound having deliquescency and a second alkali metal compound which has lower deliquescency than that of the first alkali metal compound and which has a low specific gravity. Specifically, cesium carbonate may be exemplified as the first alkali metal compound and potassium carbonate may be exemplified as the second alkali metal compound.

When a carrier contains the first alkali metal compound and the second alkali metal compound, the second alkali metal compound having a low specific gravity is arranged on the film surface side of the facilitated transport film (that is, arranged by being unevenly distributed on the surface side of the facilitated transport film) and the first alkali metal compound having a high specific gravity is arranged on the inside of the facilitated transport film (that is, arranged by being unevenly distributed on the porous support side of the facilitated transport film). Further, since the second alkali metal compound arranged on the film surface side has lower deliquescency than that of the first alkali metal compound, the film surface does not become sticky and blocking can be prevented in contrast to a case where the first alkali metal compound is arranged on the film surface side. Moreover, since the first alkali metal compound having high deliquescency is arranged inside of the film, blocking can be prevented and the separation efficiency of carbon dioxide gas can be increased in contrast to a case where the second alkali metal compound is simply arranged in the entire film.

Specifically, in a case where two or more kinds of alkali metal compounds (first and second alkali metal compounds) are used as carriers, the facilitated transport film 5 is formed of a second layer on the surface side which is the side opposite to the porous support 4 and a first layer on the porous support 4 side as a portion below the second layer. In addition, the entire facilitated transport film 5 is configured of hydrophilic compounds (hydrophilic polymers), and the second layer mainly contains a second alkali metal compound which has low deliquescency and a low specific gravity, among the compounds. Mainly, a first alkali metal compound having deliquescency is present in the first layer. In addition, the thickness of the second layer is not particularly limited, but the thickness thereof is preferably in a range of 0.01 μm to 150 μm and more preferably in a range of 0.1 μm to 100 μm from a viewpoint of exhibiting a function of sufficiently suppressing deliquescency.

For example, the second layer containing the second alkali metal compound is unevenly distributed on the surface side of the facilitated transport film 5 and the first layer containing the first alkali metal compound extends in the lower portion of the second layer, but there is not limitation thereto. For example, the interface between the two layers may not be clear and the two layers may be distinguished from each other in a state in which the concentrations of the two layers change in a gradual manner. In addition, the interface therebetween may not be flat and may be in a state of having moderate undulations.

The deliquescency of a film is suppressed by an action of the second layer containing the second alkali metal compound having low deliquescency and a low specific gravity.

The reason why the second alkali metal compound is unevenly distributed is that the specific gravity of two or more kinds of alkali metal is different from each other. That is, by adjusting the specific gravity of one metal from among the two or more alkali metals to be low, the metal having a low specific gravity can be localized in the upper portion (surface side) in a coating solution at the time of producing a film. In addition, condensation or the like can be prevented on the film surface of the second layer using properties of the second alkali metal compound of easily being crystallized while high transportation capacity of carbon dioxide or the like included in the first alkali metal compound, which has deliquescency, contained in the first layer on the inside of the film is maintained. In this manner, blocking is prevented and separation efficiency of carbon dioxide can be increased.

Moreover, since the second alkali metal compound may be present only on the film surface side for the purpose of preventing blocking, it is preferable that the second alkali metal compound is contained in a smaller amount than the first alkali metal compound. In this manner, the amount of the first alkali metal compound having high deliquescency becomes relatively large in the entire film and thus the separation efficiency of carbon dioxide can be further increased.

The ratio of the first alkali metal compound to the second alkali metal compound is not particularly limited, but the content of the first alkali metal compound is preferably 50 parts by mass or greater and more preferably 100 parts by mass or greater with respect to 100 parts by mass of the second alkali metal compound. The upper limit thereof is preferably 100000 parts by mass or less and more preferably 80000 parts by mass or less. By adjusting the ratio of the first alkali metal compound to the second alkali metal compound to be in the above-described range, the blocking properties and handling ability can be established at a high level.

Here, the number of kinds of two or more alkali metal compounds is determined by the kind of alkali metal and alkali metal compounds are determined not to be counted as one kind when the compounds have counterions different from each other. In other words, when potassium carbonate and potassium hydroxide are combined with each other, a compound having this combination can be counted as one kind of alkali metal compound.

As a combination of two or more kinds of alkali metal compound, the following combinations listed in Table 1 are preferable. In addition, in Table 1, the alkali metal compounds are displayed by the name of alkali metals, but salts or ions thereof may be used.

TABLE 1

| Combination | Second alkali metal compound | First alkali metal compound |
| --- | --- | --- |
| No. 1 | Potassium | Cesium |
| No. 2 | Potassium | Rubidium |
| No. 3 | Potassium | Cesium/rubidium |

The content of all the acidic gas carriers in the facilitated transport film also depends on the ratio of the amount of hydrophilic compounds to the acidic gas carriers and the kind of acidic gas carrier, but is preferably in a range of 0.3% by mass to 30% by mass, more preferably in a range of 0.5% by mass to 25% by mass, and particularly preferably in a range of 1% by mass to 20% by mass from viewpoints of preventing salting-out before application, reliably exhibiting the function of separating out acidic gas, and having excellent stability in the usage environment.

In a case where two or more kinds of alkali metal compound are used as carriers, when the content of the two or more kinds of alkali metal compound is described using a relationship between the content thereof and the total mass of solid contents of a hydrophilic compound which is a main component of a film, two or more kinds of alkali metal compound, and the like, the mass ratio of the two or more kinds of alkali metal compound is preferably in a range of 25% by mass to 85% by mass and more preferably in a range of 30% by mass to 80% by mass. When the amount thereof is adjusted to be in the above-described range, the function of separating out gas can be sufficiently exhibited.

In regard to the second alkali metal compound (alkali metal compound which is unevenly distributed on the surface side of the facilitated transport film 5) having lower deliquescency and a low specific gravity than the first alkali metal compound among two or more alkali metal compounds, the content thereof is preferably 0.01% by mass or greater and more preferably 0.02% by mass or greater with respect to the total mass of the solid contents such as a hydrophilic compound, two or more kinds of alkali metal compound, and the like. The upper limit thereof, which is not particularly limited, is preferably 10% by mass or less and 7.5% by mass or less. When the amount of the second alkali metal compound is extremely small, the blocking may not be prevented. In addition, when the amount thereof is extremely large, handling of the compound may become difficult.

Examples of the nitrogen-containing compound include ammonia, ammonium salts, various linear and cyclic amines, amine salts, and ammonium salts. Further, these water-soluble derivatives thereof are preferably used. Since a carrier which can be held in the facilitated transport film for a long period of time is useful, an amine-containing compound which is unlikely to be evaporated, for example, an amino acid or betaine is particularly preferable. As amine-containing compounds, amino acids such as glycine, alanine, serine, proline, histidine, taurine, and diaminopropionic acid; hetero compounds such as pyridine, histidine, piperazine, imidazole, and triazine; alkanolamines such as monoethanolamine, diethanolamine, triethanolamine, monopropanolamine, dipropanolamine, and tripropanolamine; cyclic polyether amines such as cryptand[2.1] and cryptand[2.2]; bicyclic polyether amines such as cryptand[2.2.1] and cryptand [2.2.2]; porphyrin; phthalocyanine; and ethylenediaminetetraacetic acid can be used.

As sulfur compounds, amino acids such as cystine and cysteine; polythiophene; and dodecylthiol can be used.

(Others)

The facilitated transport film may contain other components (additives) other than the hydrophilic polymer, the acidic gas carrier, and water within a range not adversely affecting separation characteristics. As components which can be arbitrarily used in a process of coating the porous support with an aqueous solution (coating solution) for forming a facilitated transport film containing a hydrophilic polymer and an acidic gas carrier and drying the support, a gelling agent which cools a coating solution film to be gelled and controls so-called setting properties; a viscosity modifier which adjusts the viscosity at the time of coating the support with the coating solution using a coating device; a cross-linking agent which is used for improving film strength of the facilitated transport film; an acidic gas absorption promoting agent, a surfactant, a catalyst, a co-solvent, a film strength control agent, and a detection agent which facilitates inspection for the presence or absence of detects in a formed facilitated transport film are exemplified.

<Porous Support Film>

The porous support 4 that supports the facilitated transport film 5 is formed by laminating the porous film 2 and the auxiliary support film 3 on each other. When the auxiliary support film 3 is included, effects for improving mechanical strength and avoiding wrinkles at the time of handling with a coating machine can be obtained and productivity can be improved.

(Porous Film)

The porous film 2 has permeability with respect to acidic gases such as carbon dioxide or the like, which are separated out.

From a viewpoint of suppressing permeation through a facilitated transport material at the time when a facilitated transport film is formed, it is preferable that the porous film 2 has a small pore diameter. It is preferable that the maximum pore diameter is 1 μm or less. The lower limit of the pore diameter, which is not particularly limited, is approximately 0.001 μm.

Here, the maximum pore diameter indicates a value measured and calculated by a bubble point method. For example, the maximum pore diameter can be measured using a permporometer (manufactured by Planar Monolithics Industries, Inc.) as a measuring device according to a bubble point method (in conformity with JIS K 3832). Here, the maximum pore diameter is a value of the largest pore diameter in a pore diameter distribution of a porous film.

The thickness of the porous film 2 is preferably in a range of 1 μm to 100 μm.

Moreover, it is preferable that the surface on the side of the porous film 2 in contact with at least the facilitated transport film 5 is a hydrophobic surface. When the surface is hydrophilic, the facilitated transport film containing moisture easily permeates into a porous portion in a usage environment and thereby a film thickness distribution or aging performance may deteriorate.

Here, hydrophobicity indicates that the contact angle of water at room temperature (25° C.) is 80° C. or higher.

In the present invention, the porous film 2 is a porous resin sheet formed of resin materials such as polyester, polyolefin, polyamide, polyimide, polysulfoneamide, polysulfone, polycarbonate, and polyacrylonitrile.

The acidic gas separation laminate of the present invention is applied is frequently used in a humidified environment in which vapor is used at a high temperature of approximately 130° C. even though the temperature of use varies depending on the application thereof. For this reason, it is preferable that the porous film has heat resistance with less change in pore structure even at a temperature of 130° C. and is formed of a material with less hydrolyzability. From this viewpoint, it is preferable that the porous film is formed by including a resin selected from a group consisting of fluorine-containing resins such as polypropylene, polytetrafluoroethylene (PTFE), and polyvinylidene fluoride (PVDF). In addition, a PTFE porous film is most preferable.

(Auxiliary Support Film)

The auxiliary support film 3 is provided for reinforcing the porous film 2 and is not particularly limited as long as the strength, drawing resistance, and gas permeability thereof are excellent. A non-woven fabric, a woven fabric, a knitted fabric, and a mesh having a maximum pore diameter of 0.001 μm to 500 μm can be appropriately selected to be used.

The thickness of the auxiliary support film 3 is preferably in a range of 50 μm to 300 μm.

It is preferable that the auxiliary support film 3 is formed of a material which has heat resistance and less hydrolyzability similar to the porous film 2 described above. As fibers constituting non-woven fabric, woven fabric, or knitted fabric, fibers formed of fluorine-containing resins, for example, modified polyamide such as polypropylene or aramide; polytetrafluoroethylene; and polyvinylidene fluoride which have excellent durability and heat resistance are preferable. It is preferable that the same materials are used as resin materials constituting the mesh.

Among these materials, it is particularly preferable that a non-woven fabric formed of polypropylene (PP) which is inexpensive and has high mechanical strength is used.

(Permeating Gas Channel Member)

The permeating gas channel member 6 is a member which reacts with a carrier and in which acidic gas permeated and passed through the gas separation film 10 flows. It is preferable that the permeating gas channel member 6 is formed of an uneven member with open gaps such that the permeating gas channel member 6 has a function as a spacer, a function of allowing acidic gas to flow into the permeating gas collecting pipe side, and a function of allowing an adhesive described below to become impregnated. The shape of tricot knitting or plain weave is exemplified. Further, when a raw material gas containing water vapor at a high temperature is assumed, preferably, the permeating gas channel member has moist heat resistance similar to the gas separation film.

As specific examples of materials used for the permeating gas channel member 6, polyester-based materials such as epoxy-impregnated polyester; polyolefin-based materials such as polypropylene; fluorine-based materials such as polytetrafluoroethylene; and metal-based materials such as wire netting are preferable.

The thickness of the permeating gas channel member 6, which is not particularly limited, is preferably in a range of 100 μm to 1000 μm, more preferably in a range of 150 μm to 950 μm, and still more preferably in a range of 200 μm to 900 μm.

In addition, as the permeating gas channel member, one sheet of one kind of member may be used, but members of the same kind or members of plural kinds may be laminated on each other for use.

<Adhesive>

In the present invention, adhesives 8a and 8b used for the sealing unit 7 and the film protection unit 9 have moist heat resistance.

The material of the adhesive is not particularly limited as long as the material has moist heat resistance, and examples thereof include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, polyester, a cellulose derivative (nitrocellulose or the like), a styrene-butadiene copolymer, various synthetic rubber resins, a phenol resin, a melamine resin, a phenoxy resin, a silicone resin, and a urea formamide resin.

An epoxy resin is particularly preferable.

Further, for the purpose of improving wettability of an adhesive, a material containing a solvent or a surfactant may be used.

In addition, since the respective suitable viscosities of an adhesive which is initially applied to form a film protection unit and has a relatively low viscosity and an adhesive which is subsequently applied to form a sealing unit and has a relatively high viscosity vary depending on the materials of the porous film and the porous support film, the thicknesses of respective films, the pore diameter, and the pore density, the viscosity is adjusted using an appropriate solvent or the like according to the materials of the porous film, the auxiliary support film, and the adhesive to be used and then the adhesives are used.

In a particularly preferable form of the laminate 1, the porous film 2 is a PTFE porous sheet, the auxiliary support film 3 uses the porous support 4 which is PP unwoven fabric, the channel member 6 uses PP woven fabric, and an epoxy resin is used as the adhesive 8 used for the sealing unit 7.

Further, the gas separation film 10 having the facilitated transport film 5 on the support 4 may have another layer other than the facilitated transport film 5 on the support 4. As another layer, an undercoat layer provided between the porous support 4 and the facilitated transport film 5, an intermediate layer, or a protective layer (for example, a carrier elution preventing layer) provided on the facilitated transport film 5 is exemplified.

Figure 1E:
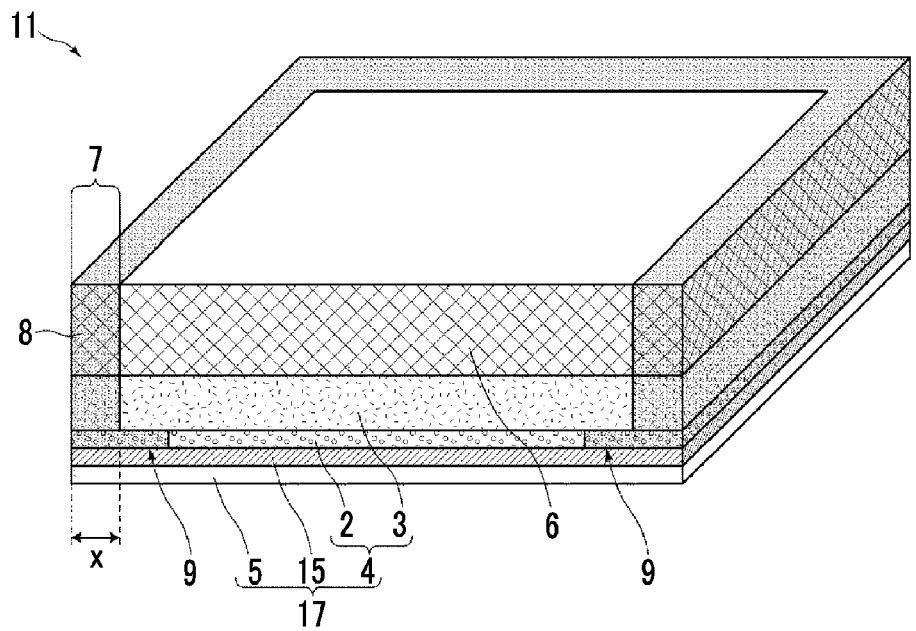
FIG. 1E is a view illustrating a design modification example of the acidic gas separation laminate of the present invention.

FIG. 1E is a perspective view schematically illustrating a lamination configuration of the acidic gas separation laminate 11 according to a design modification example of the embodiment. In the laminate 11 of the example, an acidic gas separation film 17 of the above-described laminate 1 includes an intermediate layer 15 between the porous support 4 and the facilitated transport film 5.

As described above, since the facilitated transport film needs to hold a large amount of moisture in the film for the purpose of allowing sufficient functioning of a carrier, a hydrophilic compound having extremely high water absorption properties and water retention properties is used. Further, in the facilitated transport film, as the content of a carrier such as a metal carbonate becomes larger, the amount of water adsorption increases and separation performance of acidic gas improves. For this reason, the facilitated transport film is a gel film or a film having low viscosity in many cases. Accordingly, from a viewpoint that the porous film of the acidic gas separation film suppresses impregnation of a facilitated transport material at the time of formation of a facilitated transport film, it is preferable that the surface on the side in contact with at least the facilitated transport film has hydrophobicity. However, even when a hydrophobic porous film is included, since a raw material gas in a temperature range of 100° C. to 130° C. at a humidity of approximately 90% is supplied at a pressure of approximately 1.5 MPa at the time of separating out acidic gas, due to the use thereof, there is a tendency that the facilitated transport film gradually enters the porous support and a separation capacity of the acidic gas decreases with time.

Consequently, it is preferable that the acidic gas separation film includes the intermediate layer 15, which more effectively suppresses impregnation of the facilitated transport material (film) into the porous film, between the porous film and the facilitated transport film.

(Intermediate Layer)

The intermediate layer 15 is not particularly limited as long as the layer has hydrophobicity with gas permeability, but it is preferable that the intermediate layer 15 has air conductivity and is a layer denser than the porous film. When the intermediate layer 15 is included, it is possible to prevent the facilitated transport film 5 having high uniformity from entering the porous film 2.

The intermediate layer 15 may be formed on the porous film 2 or may have a impregnation region which becomes impregnated into the porous film 2. It is preferable that the impregnation region is smaller within a range in which adhesion properties of the porous film 2 to the intermediate layer 15 are excellent.

As the intermediate layer 15, a polymer layer having a siloxane bond in a repeating unit is preferable. Examples of such a polymer layer include silicone-containing polyacetylene such as organopolysiloxane (a silicone resin) or polytrimethyl silyl propyne. As a specific example of the organopolysiloxane, an organopolysiloxane represented by the following formula is exemplified.

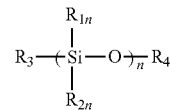

In the formula above, n represents an integer of 1 or greater. Here, from viewpoints of availability, volatility, and viscosity, the average value of n is preferably in a range of 10 to 1,000,000 and more preferably in a range of 100 to 100,000.

In addition, $R_{1n}$, $R_{2n}$, $R_3$, and $R_4$ each independently represent any one selected from a group consisting of a hydrogen atom, an alkyl group, a vinyl group, an aralkyl group, an aryl group, a hydroxyl group, an amino group, a carboxyl group, and an epoxy group. Further, n number of $R_{1n}$'s and $R_{2n}$'s may be the same as or different from each other. In addition, an alkyl group, an aralkyl group, and an aryl group may have a ring structure. Further, the alkyl group, the vinyl group, the aralkyl group, and the aryl group may include a sub stituent and the substituent is selected from an alkyl group, a vinyl group, an aryl group, a hydroxyl group, an amino group, a carboxyl group, an epoxy group, and a fluorine atom. These substituents can further include a substituent if possible.

As an alkyl group, a vinyl group, an aralkyl group, and an aryl group selected for $R_{1n}$, $R_{2n}$, $R_3$, and $R_4$, from a viewpoint of availability, an alkyl group having 1 to 20 carbon atoms, a vinyl group, an aralkyl group having 7 to 20 carbon atoms, and an aryl group having 6 to 20 carbon atoms are more preferable.

Particularly, it is preferable that $R_{1n}$, $R_{2n}$, $R_3$, and $R_4$ represent a methyl group or an epoxy-substituted alkyl group, and epoxy-modified polydimethyl siloxane (PDMS) or the like can be suitably used.

It is preferable that a silicone resin layer is formed by forming a coating film. A coating solution (silicone coating solution) used for film formation may include a monomer, a dimer, a trimer, an oligomer, or a prepolymer of a compound which becomes a silicone resin layer, or a mixture of these. The silicone resin layer may further include a curing agent, a curing accelerator, a crosslinking agent, a thickener, or a reinforcing agent.

The intermediate layer 15 is a film having gas permeability, but the gas permeability can be significantly degraded when the thickness thereof is large. The intermediate layer 15 may be thin if the intermediate layer entirely covers the surface of the porous film 2 without any space left. From this viewpoint, the film thickness of the intermediate layer 15 is preferably in a range of 0.01 μm to 30 μm and more preferably in a range of 0.1 μm to 15 μm.

[Method of Producing Acidic Gas Separation Laminate]

Next, a method of producing the laminate 1 of the embodiment will be simply described with reference to FIGS. 2A to 2D. FIGS. 2A to 2D are partially enlarged sectional views respectively illustrating a production process.

First, the porous support 4 formed by laminating the porous film 2 and the auxiliary support film 3 on each other is prepared.

Further, a coating composition used to form an acidic gas separation facilitated transport film is adjusted. The coating composition is prepared by adding appropriate amounts of the hydrophilic polymer, an acidic gas carrier (for example, a carbon dioxide carrier), and water, and other additives such as a gelling agent and a crosslinking agent if necessary to water (room temperature water or pressurized hot water), sufficiently stirring the mixture, and heating the mixture while the mixture is stirred if necessary to promote dissolution. Further, a hydrophilic polymer, an acidic gas carrier, and other components may be individually added to water or may be mixed with each other in advance with the resulting mixture being added to water.

Figure 2A:
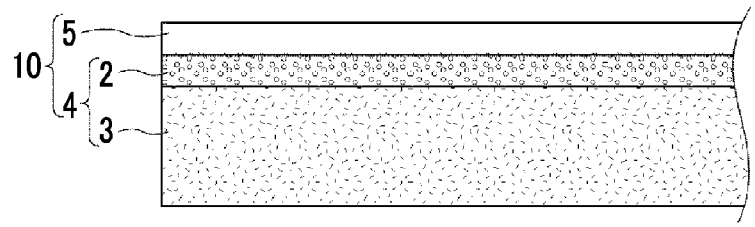
FIG. 2A is a partial sectional view illustrating a process of producing the acidic gas separation laminate.

As illustrated in FIG. 2A, the porous film 2 of the porous support 4 is coated with the coating composition and dried, thereby forming the facilitated transport film 5 on the porous support 4. A gas separation composite film of the porous support 4 and the facilitated transport film 5 is the gas separation film 10.

Figure 2B:
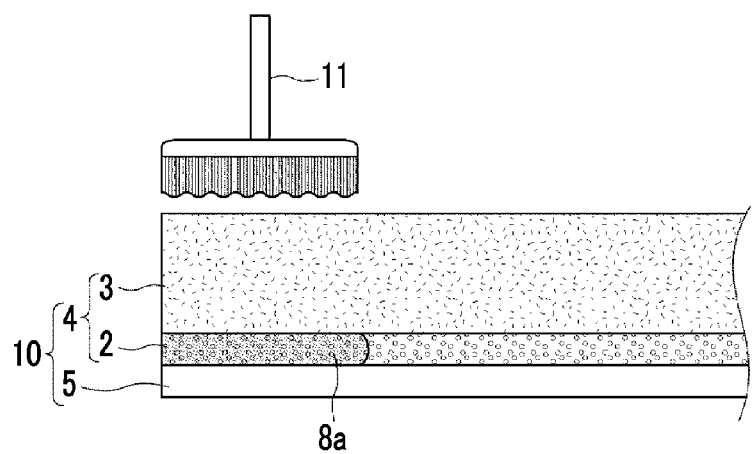
FIG. 2B is a partial sectional view illustrating the process of producing the acidic gas separation laminate, continuing after FIG. 2A.

Subsequently, as illustrated in FIG. 2B, the auxiliary support film 3 is set to be the upper surface and three sides from the peripheral edge of the auxiliary support film are coated with the adhesive 8a using a brush 11 from the auxiliary support film 3 side. At this time, the adhesive 8a passes through the mesh of the auxiliary support film 3 without remaining in the mesh at the time of application and becomes impregnated into the pores of the porous film 2 by adjusting the viscosity of the adhesive 8a to be relatively low. The adhesive 8a remains in the pores of the porous film 2 without being impregnated into the separation film.

Figure 2C:
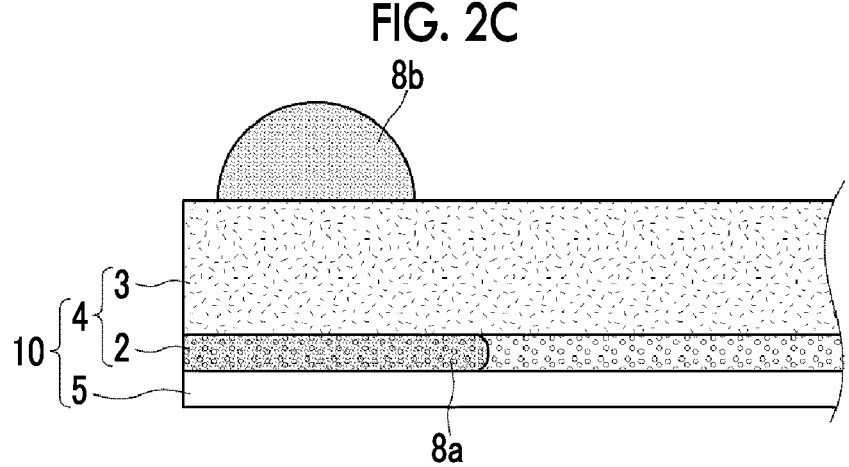
FIG. 2C is a partial sectional view illustrating the process of producing the acidic gas separation laminate, continuing after FIG. 2B.
Figure 4A:
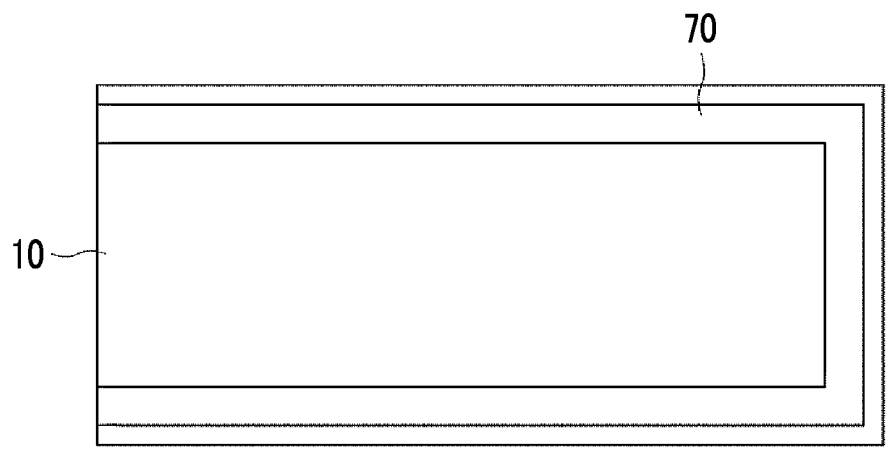
FIG. 4A is a plan view illustrating a method of applying an adhesive using a stamp.

Next, as illustrated in FIG. 2C, the adhesive 8b is applied to three sides, in which the front of the peripheral edge of the auxiliary support film 3 is coated with the adhesive 8a, over a width narrower than the width of the adhesive 8a (see FIG. 4A). Further, the viscosity of the adhesive 8b is adjusted to be higher than that of the adhesive 8a used for application of the adhesive previously.

Figure 2D:
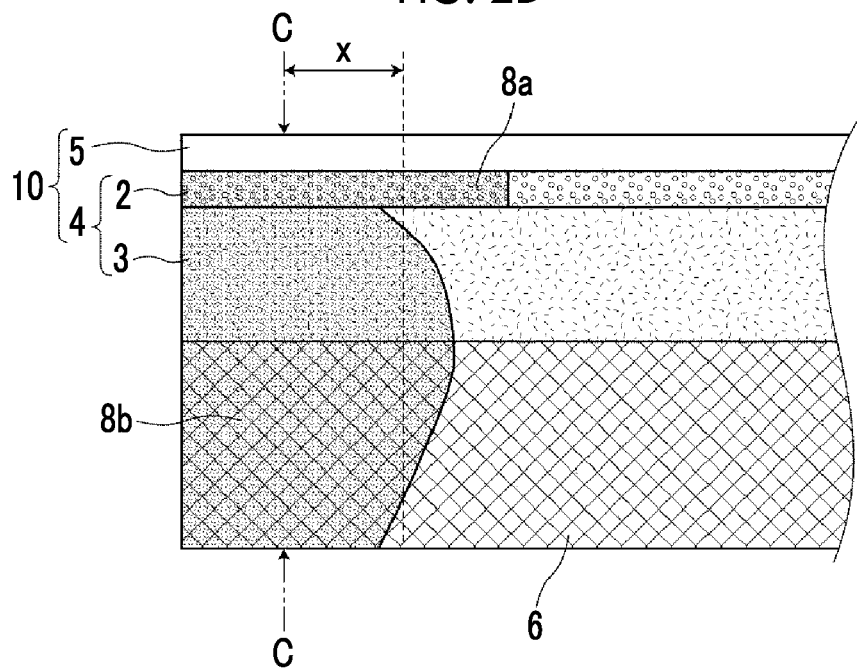
FIG. 2D is a partial sectional view illustrating the process of producing the acidic gas separation laminate, continuing after FIG. 2C.

Next, as illustrated in FIG. 2D, the adhesive 8b becomes impregnated into the eyes (pores) of the auxiliary support film 3 and the channel member 6 due to placing the gas separation film 10 on the channel member 6 such that the gas separation film 10 is brought into contact with the coating surface of the adhesive 8b (alternatively, placing the channel member 6 on the coating surface of the adhesive 8b of the gas separation film 10) and applying tension thereto in the film surface direction.

As a result, the sealing unit 7 formed by the adhesive 8 continuously permeating into the porous film 2, the auxiliary support film 3, and the gas channel member 6 in the lamination direction is formed as illustrated in FIG. 2D. At this time, since the adhesive spreads centering on the coating unit, the spreading region of the adhesive becomes non-uniform in the lamination direction in many cases.

Further, the coating amount of the adhesive 8b having a high viscosity in the permeation region is adjusted such that the width thereof is narrower than that of the permeation region of the adhesive 8a in the porous film. In this manner, the film protection unit 9 is formed in a state of being adjacent to the sealing unit 7 as illustrated in FIG. 1B.

Finally, the end portion illustrated in FIG. 2D is cut at the position of the C-C line, so-called trimming (end surface modifying process) is performed, and the laminate 1 is obtained.

In an initial adhesive application process of applying the adhesive 8a having a relatively low viscosity, a method of using the brush 11 is suitably used.

Figure 3A:
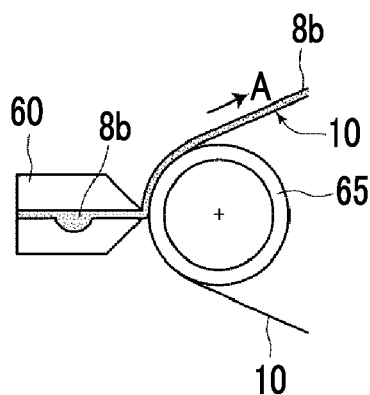
FIG. 3A is a view illustrating a method of applying an adhesive using a slot die.
Figure 3B:
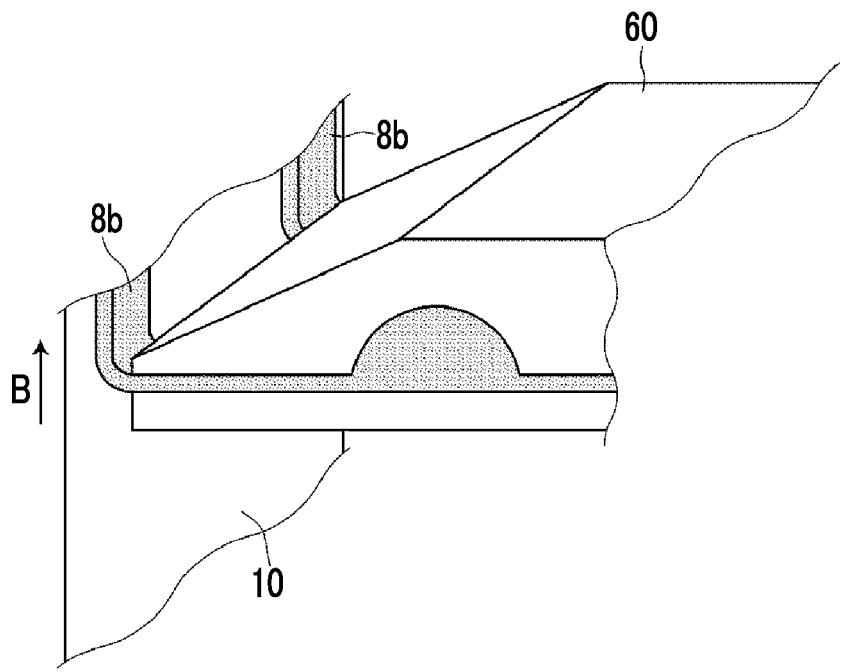
FIG. 3B is a view illustrating another method of applying an adhesive using a slot die.

In a second adhesive application process of applying the adhesive 8b having a relatively high viscosity, as illustrated in FIGS. 3A and 3B, a slot die 60 can be used. The separation film 10 is conveyed in an A direction using a conveying roller 65 as illustrated in FIG. 3A and then the adhesive 8b may be applied using the slot die 60, or the adhesive 8b may be applied while the separation film 10 is conveyed in a direction B perpendicular to the slot die 60 as illustrated in FIG. 3B.

Figure 4B:
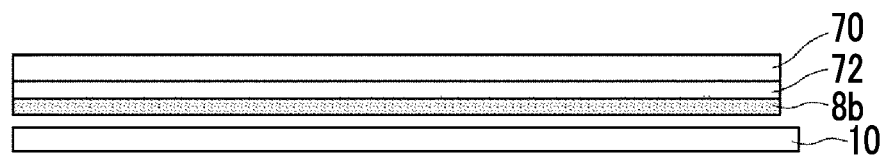
FIG. 4B is a side view illustrating the method of applying an adhesive using a stamp.

Alternatively, as illustrated in the plan view of FIG. 4A and a side view of FIG. 4B, a method of applying the adhesive 8b by pressing a sponge 72 into which the adhesive 8b becomes impregnated into the surface of the separation film 10 (surface of the auxiliary support film) using a stamp 70 including the sponge 72 in the form corresponding to a coating area may be used.

When these adhesive application methods are used, automation of the production process becomes easy and uniform application can be performed by controlling the application amount and the application width.

The acidic gas separation laminate of the present invention is used by being incorporated in the acidic gas separation module. The acidic gas separation module of the present invention includes a permeating gas collecting pipe and the laminated film of the present invention which is connected to the collecting pipe. As the form of the acidic gas separation module, various kinds of module form such as a spiral type module and a flat film type module can be employed.

The laminate illustrated in FIG. 1A described above has a configuration of a minimum unit of the present invention, but the laminate of the present invention can be used by appropriately changing the configuration according to the module configuration to be applied.

Figure 8A:
FIG. 8A is a view illustrating a process of producing the spiral type module.
Figure 8B:
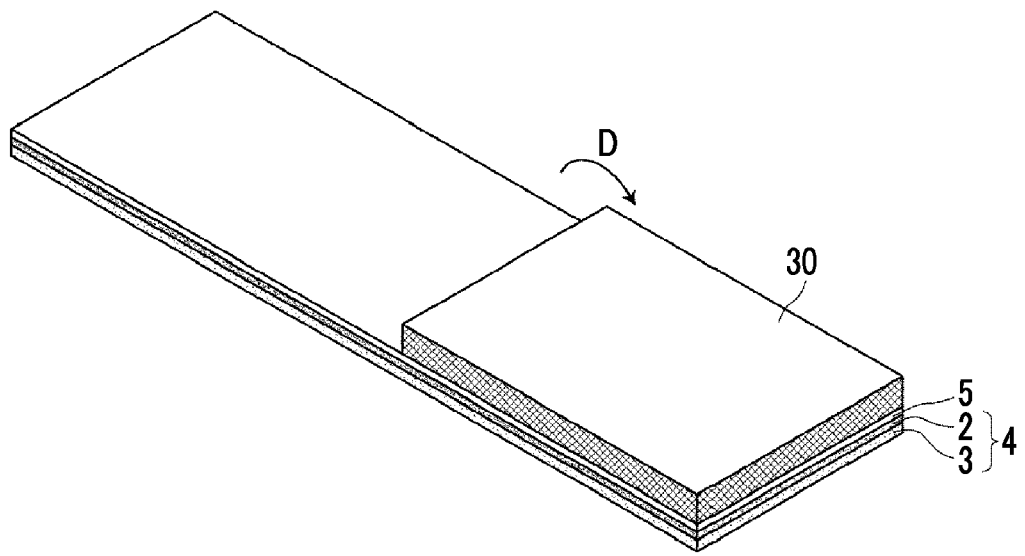
FIG. 8B is a view illustrating the process of producing the spiral type module, continuing after FIG. 8A.
Figure 8C:
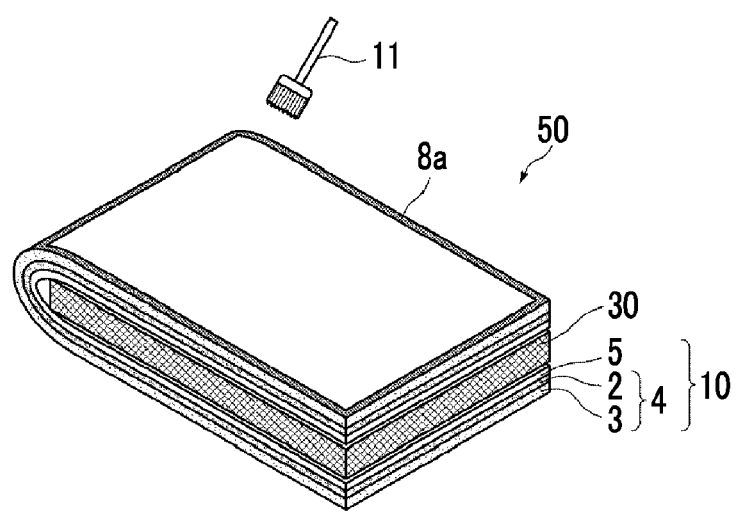
FIG. 8C is a view illustrating the process of producing the spiral type module, continuing after FIG. 8B.
Figure 8D:
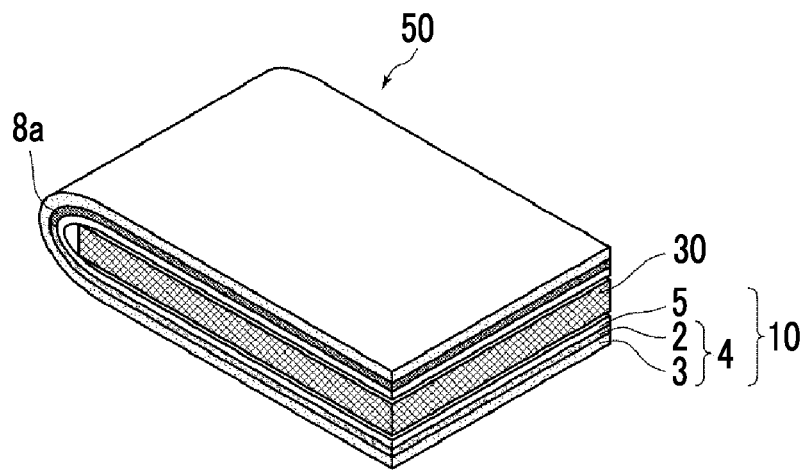
FIG. 8D is a view illustrating the process of producing the spiral type module, continuing after FIG. 8C.
Figure 8E:
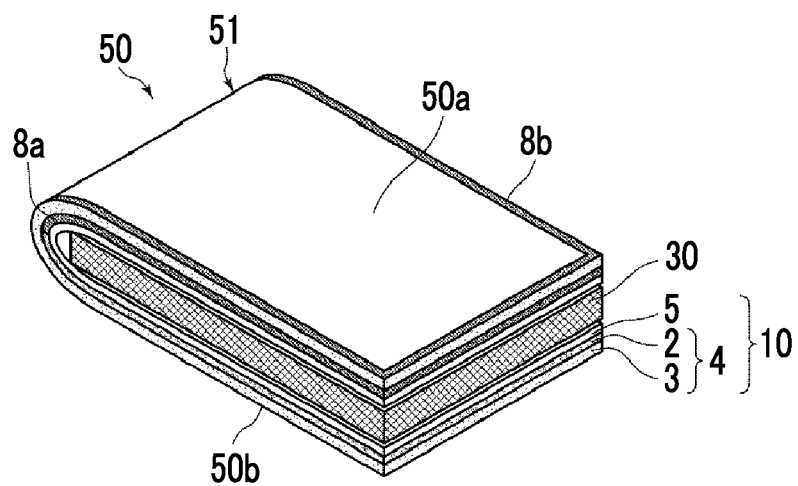
FIG. 8E is a view illustrating the process of producing the spiral type module, continuing after FIG. 8D.
Figure 8F:
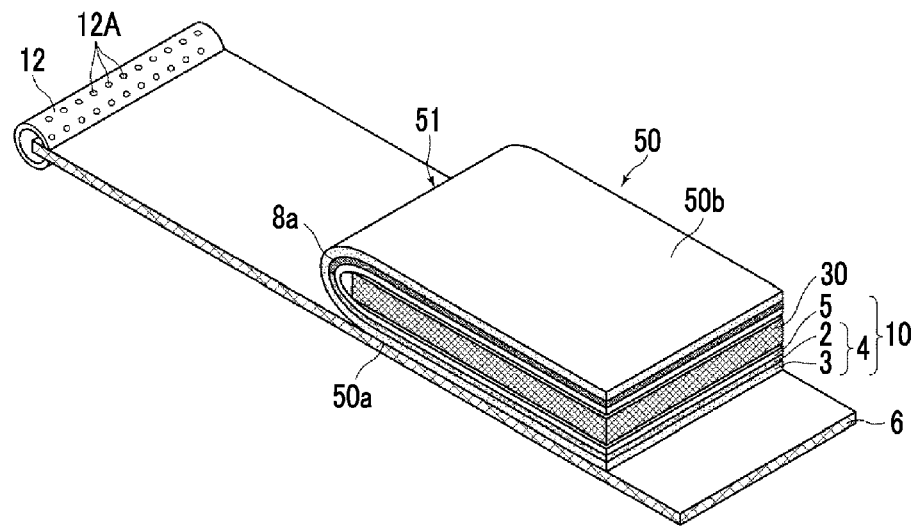
FIG. 8F is a view illustrating the process of producing the spiral type module, continuing after FIG. 8E.
Figure 8G:
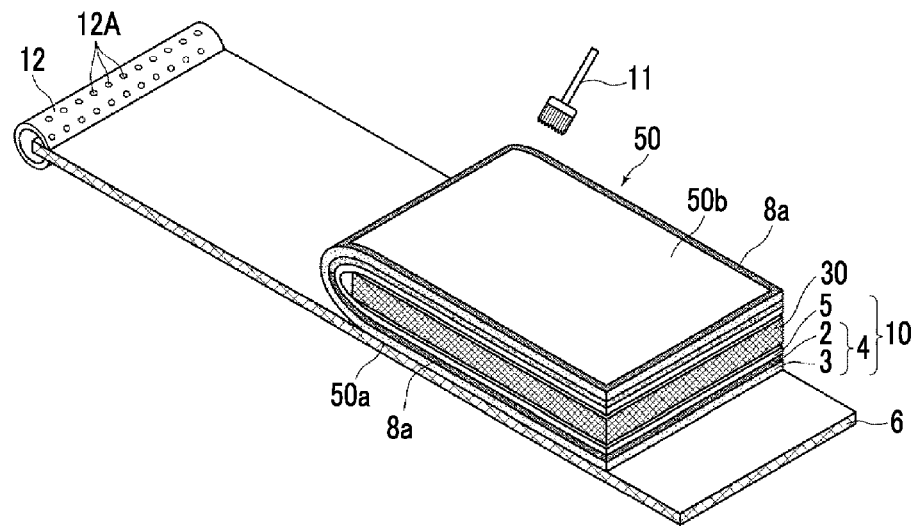
FIG. 8G is a view illustrating the process of producing the spiral type module, continuing after FIG. 8F.
Figure 8H:
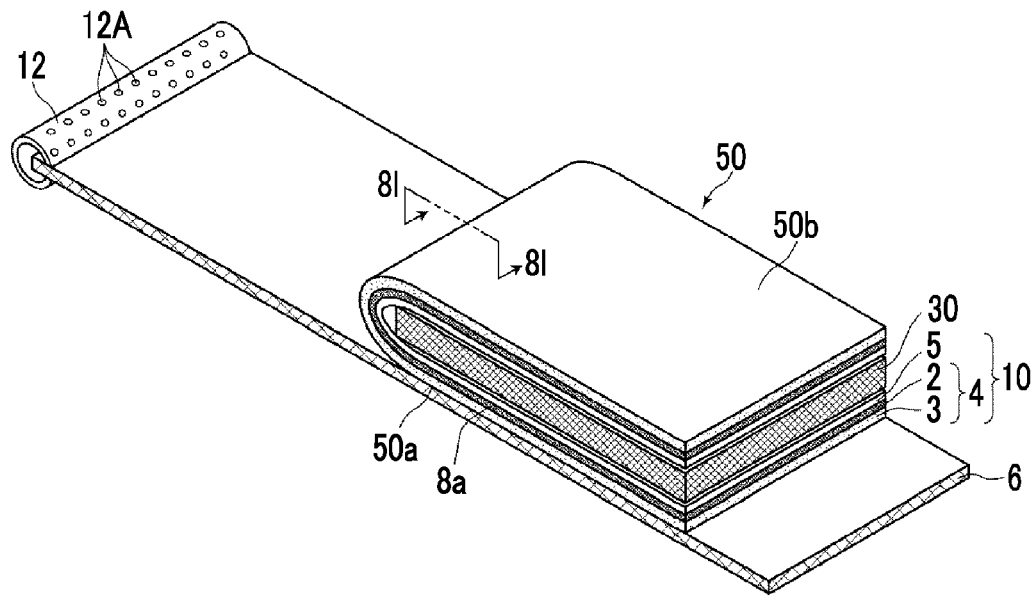
FIG. 8H is a view illustrating the process of producing the spiral type module, continuing after FIG. 8G.
Figure 8I:
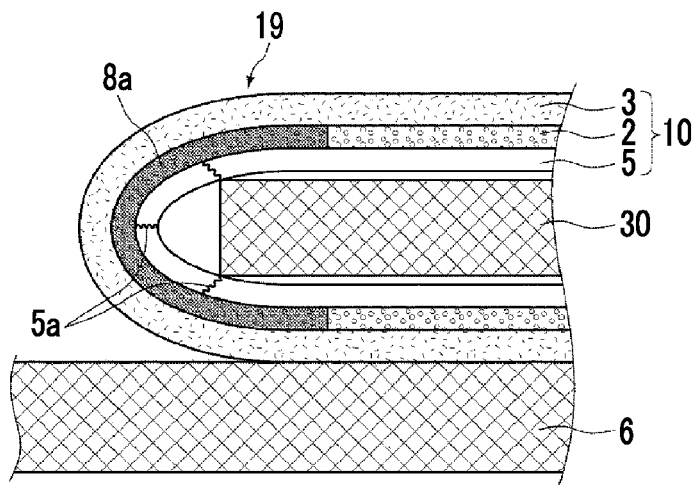
FIG. 8I is a sectional view taken along the line 8I-8I of FIG. 8H.

Further, as illustrated in FIG. 8I, a laminate which includes the supply gas channel member 30 that is disposed between the acidic gas separation facilitated transport films 5 of the acidic gas separation film 10 that is obtained by inwardly folding the acidic gas separation facilitated transport film 5 into two on the channel member 6 in the length direction and in which the film protection unit 19 is formed on a portion overlapping the portion of the acidic gas separation facilitated transport film 5 with which an end portion of the supply gas channel member 30 is brought into contact is one form of the acidic gas separation laminate of the present invention. At this time, the film protection unit 19 is not formed adjacent to the sealing unit and may be individually formed. In this case, in the film protection unit 19, the impregnation rate of the adhesive in the porous film 2 may be 10% or greater, more preferably 40% or greater, and still more preferably 60% or greater. The impregnation rate of the adhesive in the auxiliary support film 3 is smaller than the impregnation rate in the porous film 2.

Such a film protection unit 19 is formed by coating the auxiliary support film 3 side with the adhesive. As the adhesive, the adhesive 8a which passes through the pores of the auxiliary support film 3, does not almost remain in the auxiliary support film 3, and has such a viscosity that the adhesive permeats into the pores of the porous film 2 may be used.

[Acidic Gas Separation Module]

Hereinafter, the acidic gas separation module to which the acidic gas separation laminate of the present invention is applied will be described in detail.

<Spiral Type Acidic Gas Separation Module>

Figure 5:
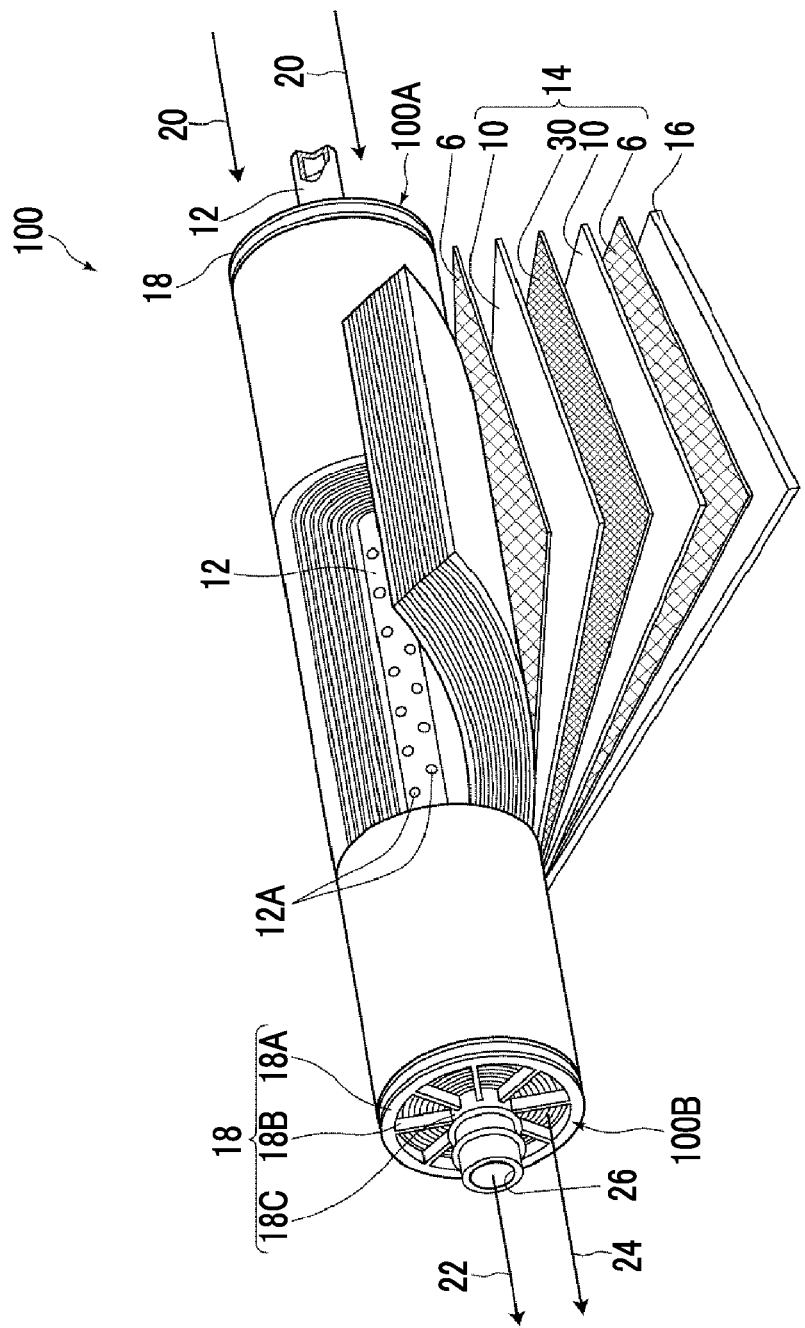
FIG. 5 is a configuration view schematically illustrating a spiral type module by cutting out a part thereof according to the embodiment of the present invention.

FIG. 5 is a configuration view schematically illustrating a spiral type acidic gas separation module 100 (hereinafter, referred to as a spiral type module 100) which is the first embodiment of the acidic gas separation module of the present invention by cutting out a part thereof.

As illustrated in FIG. 5, as a basic structure, the spiral type module 100 is configured such that the outermost periphery thereof is covered by a coating layer 16 in a state in which one or a plurality of laminates 14 described below is wound around the permeating gas collecting pipe 12 and telescoping prevention plates 18 are respectively attached to both ends of these units. When raw material gas 20 containing acidic gas is supplied to the laminate 14 from one end portion 100A side, the module 100 having such a configuration separates the raw material gas 20 into acidic gas 22 and residual gas 24 and separately discharges the acidic gas 22 and the residual gas 24 to another end portion 100B side by using the configuration of the laminate 14 described below.

Figure 6:
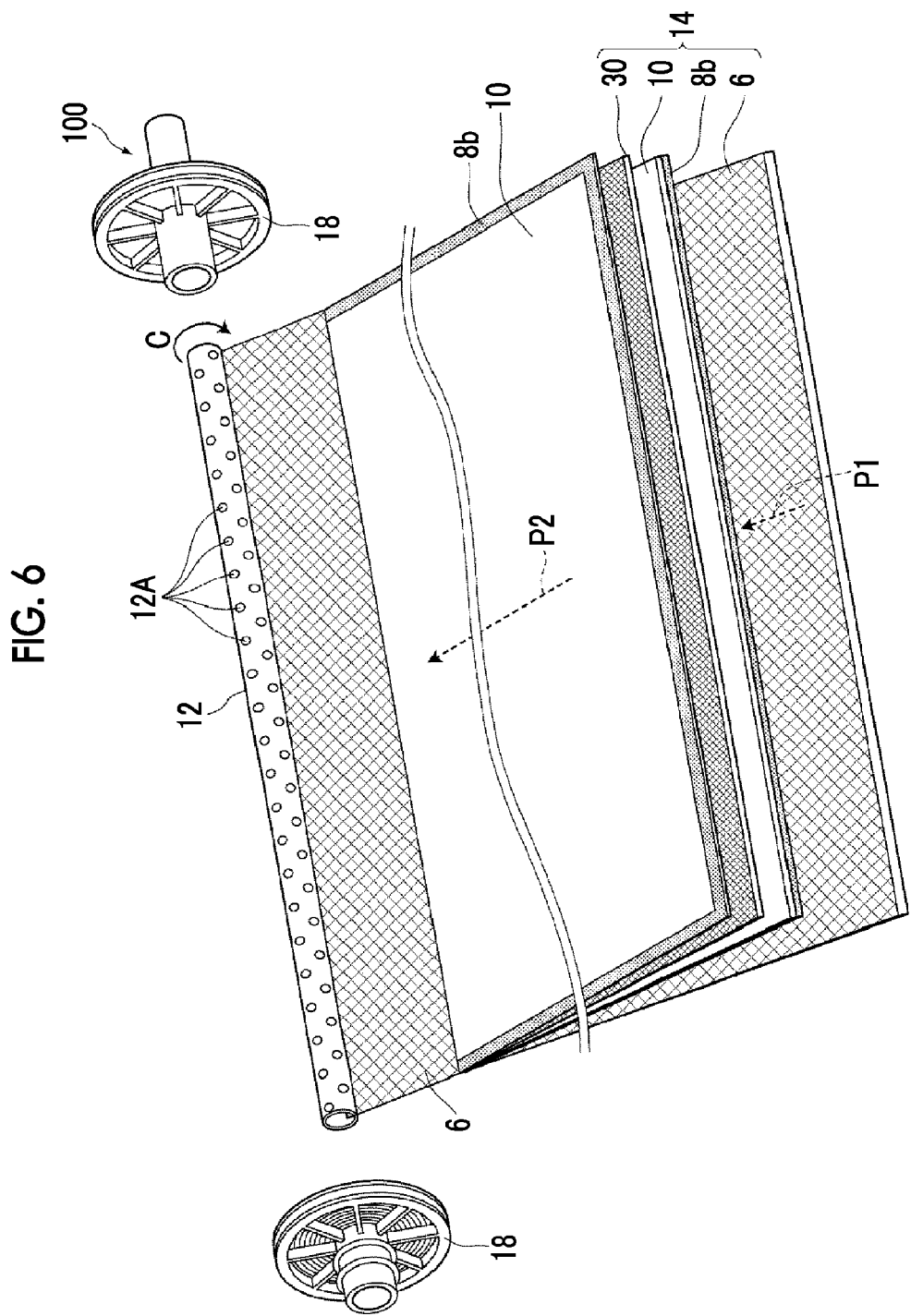
FIG. 6 is a view illustrating the state before the laminate is wound around the permeating gas collecting pipe.
Figure 7:
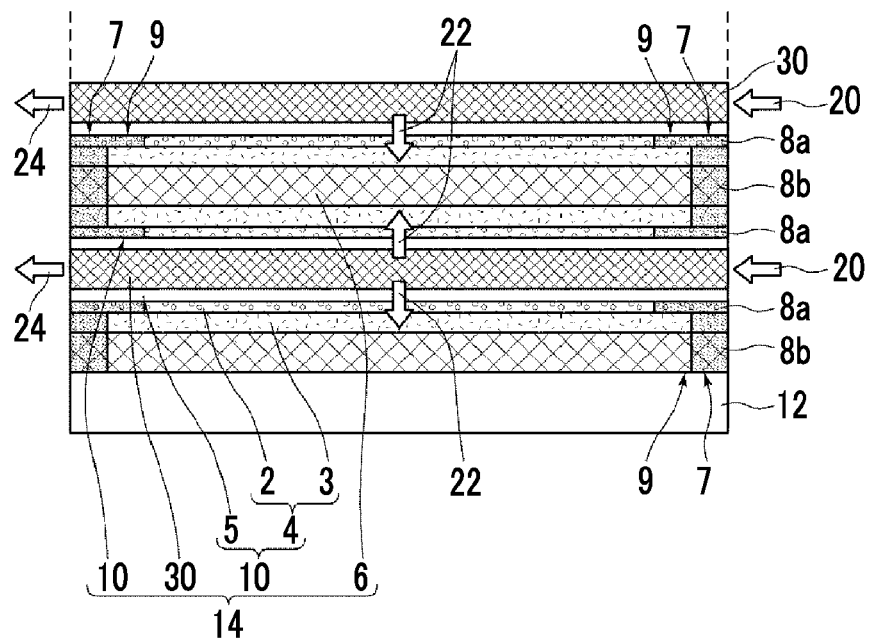
FIG. 7 is a sectional view illustrating a part of a cylindrical wound body obtained by winding a laminate around a permeating gas collecting pipe.

FIG. 6 is a perspective view illustrating a state before the laminate 14 is wound around the permeating gas collecting pipe 12 and FIG. 7 is a sectional view illustrating a part of a cylindrical wound body obtained by winding the laminate around the permeating gas collecting pipe.

The permeating gas collecting pipe 12 is a cylindrical pipe in whose wall a plurality of through-holes 12A is formed. One end portion side (one end portion 100A side) of the permeating gas collecting pipe 12 is closed and another end portion side of the pipe (another end portion 100B side) is open and becomes a discharge port 26 from which there is permeation from the laminate and from which the acidic gas 22 such as carbon dioxide is collected from the through-holes 12A is discharged.

The shape of the through-hole 12A is not particularly limited, but it is preferable that a circular hole having a diameter of 0.5 mmϕ to 20 mmϕ is open. Further, it is preferable that the through-holes 12A are uniformly arranged with respect to the surface of the permeating gas collecting pipe 12.

The coating layer 16 is formed of a blocking material which can block the raw material gas 20 from passing through the acidic gas separation module 100. It is preferable that the blocking material further has moist heat resistance. Here, "heat resistance" in moist heat resistance indicates resistance to heat at a temperature of 80° C. or higher. Specifically, heat resistance at 80° C. or higher means that the shape before storage is maintained after storage for 2 hours under a temperature condition of 80° C. or higher and curls which are generated due to thermal contraction or thermofusion and can be visually confirmed are not generated. Further, "moist resistance" in moist heat resistance means that the shape before storage is maintained after storage for 2 hours under the conditions of a temperature of 40° C. and a relative humidity of 80% and curls which are generated due to thermal contraction or thermofusion and can be visually confirmed are not generated.

The telescope prevention plate 18 includes an outer peripheral circular portion 18A, an inner peripheral circular portion 18B, and a radial spoke portion 18C and it is preferable that the respective portions are formed of materials having moist heat resistance.

The laminate 14 is configured by laminating the permeating gas channel member 6 to a leaf 50 which is formed by a supply gas channel member 30 being interposed between the acidic gas separation film 10 obtained by inwardly folding the facilitated transport film 5 into two. The acidic gas separation film 10 includes the porous support 4 formed by laminating the porous film 2 and the auxiliary support film 3 and the acidic gas separation facilitated transport film 5 including an acidic gas carrier that is disposed on the porous film 2 side of the porous support 4 and reacts with at least a hydrophilic compound and acidic gas in raw material gas. In addition, the acidic gas separation film 10 and the permeating gas channel member 6 include the sealing unit 7 and the film protection unit 9 on the three sides from the peripheral edge of the laminate 14. Further, the folded portion of the acidic gas separation film 10 which is folded into two includes the film protection unit 9. Moreover, the acidic gas separation film 17 including the intermediate layer 15 between the porous support 4 and the facilitated transport film 5 may be used in place of the acidic gas separation film 10.

The laminate 14 is a form of the acidic gas separation laminate of the present invention. That is, the sealing unit 7 has a impregnation rate of the adhesive in the porous film 2 of 60% or greater and a impregnation rate of the adhesive in the auxiliary support film 3 and the permeating gas channel member 6 of greater than or equal to the impregnation rate of the adhesive in the porous film 2. The sealing unit 7 is formed to have a width of 5 mm or greater from the end portion of the laminate and the film protection unit 9 is formed in a state of being adjacent to the sealing unit 7. The details of the sealing unit 7 and the film protection unit 9 are the same as the case of the laminate 1 described above.

The number of sheets of the laminates 14 to be wound around the permeating gas collecting pipe 12 is not particularly limited. One sheet or plural sheets of laminates may be used, but the film area of the facilitated transport film 5 can be improved by increasing the number of sheets (number of laminations). In this manner, the amount of the acidic gas 22 which can be separated out by one module can be increased. Further, the length of the laminate 14 may be further increased in order to improve the film area.

In addition, in a case where the number of sheets of the laminates 14 is plural, the number thereof is preferably 50 sheets or less, more preferably 45 sheets or less, and still more preferably 40 sheets or less. When the number of sheets is less than or equal to the above-described range, the winding of the laminate 14 becomes easy and the processing suitability is improved.

The width of the laminate 14, which is not particularly limited, is preferably in a range of 50 mm to 10000 mm, more preferably in a range of 60 mm to 9000, and still more preferably in a range of 70 mm to 8000 mm. In addition, from a practical viewpoint, it is preferable that the width of the laminate 14 is in a range of 200 mm to 2000 mm. When the width thereof is adjusted to be greater than or equal to each of the lower limits, an effective film area of the acidic gas separation film 10 can be secured even when a resin is applied (sealed). Further, when the width thereof is adjusted to be less than or equal to each of the upper limits, horizontality of a winding core is maintained and generation of winding deviation can be suppressed.

In the spiral type module, the laminate 14 is wound around the permeating gas collecting pipe 12 in an arrow C direction as illustrated in FIG. 6 and a configuration in which the laminate 14 is laminated on the permeating gas channel member 6 wound around the permeating gas collecting pipe 12 in the section is included as illustrated in FIG. 7. The laminates 14 are bonded to each other through the sealing unit 7 at both ends thereof. In this configuration, the raw material gas 20 containing the acidic gas 22 is supplied from the end portion of the supply gas channel member 30, the acidic gas 22 separated by permeating into the acidic gas separation film 10 is collected in the permeating gas collecting pipe 12 via the permeating gas channel member 6 and the through-holes 12A, and the gas is recovered through the discharge port 26 connected to the permeating gas collecting pipe 12. Further, the residual gas 24, which is separated from the acidic gas 22, passing through spaces and the like of the supply gas channel member 30 is discharged from the end portion of the supply gas channel member 30 on the side of the discharge port 26 provided in the acidic gas separation module 100.

As illustrated in FIG. 6, the through-holes 12A are covered by the permeating gas channel member 6 by allowing the permeating gas collecting pipe 12 to rotate in an arrow C direction in the figure, and the acidic gas separation film 10 and the permeating gas channel member 6 are bonded to each other to form a sealing unit 7 using the adhesive 8 applied to the front and rear surfaces of the gas separation film 10 folded into two in a state of the supply gas channel member 30 being interposed therebetween when the laminate 14 is wound around the permeating gas collecting pipe multiple times.

The sealing unit 7 is not provided in the end portion on the collecting pipe 12 side arranged along the permeating gas collecting pipe 12 between the winding start acidic gas separation film 10 and the permeating gas channel member 6 and channels P1 and P2 in which the acidic gas 22 having permeated and passed through the acidic gas separation film 10 flows into the through-holes 12A are formed in the region surrounded by the sealing unit 7.

Respective elements of the laminate 14 applied to the acidic gas separation module are the same as the constituent elements denoted by the same reference numerals in the acidic gas separation laminate 1 described above. The laminate 14 of the acidic gas separation module further includes the supply gas channel member 30.

(Supply Gas Channel Member)

The supply gas channel member 30 is a member to which raw material gas containing acidic gas is supplied from one end portion of the acidic gas separation module, has a function as a spacer, and allows turbulence to be generated in the raw material gas, which is preferable, and thus a net-like member is preferably used as the supply gas channel member 30. Since a channel of gas is changed due to the shape of a net, the shape of a net unit lattice is selected from the shapes of a diamond, a parallelogram, and the like for use. In addition, when it is assumed that raw material gas containing water vapor at a high temperature is supplied, it is preferable that the supply gas channel member 30 has moist heat resistance similar to the gas separation film 10.

The material of the supply gas channel member 30 is not particularly limited and examples thereof include resin materials such as paper, high-quality paper, coated paper, cast-coated paper, synthetic paper, cellulose, polyester, polyolefin, polyamide, polyimide, polysulfone, aramide, and polycarbonate; and inorganic materials such as metals, glasses, and ceramics. Preferred examples of the resin materials include polyethylene, polystyrene, polyethylene terephthalate, polytetrafluoroethylene (PTFE), polyethersulfone (PES), polyphenylene sulfide (PPS), polysulfone (PSF), polypropylene (PP), polyimide, polyetherimide, polyether ether ketone, and polyvinylidene fluoride.

From a viewpoint of moist heat resistance, preferred examples of the materials include inorganic materials such as ceramics, glasses, and metals; and organic resin materials having heat resistance at a temperature of 100° C. or higher, and high-molecular-weight polyester, polyolefin, heat-resistant polyamide, polyimide, polysulfone, aramide, polycarbonate, metals, glasses, and ceramics can be suitably used. More specifically, it is preferable that the supply gas channel member 30 is configured by including at least one material selected from a group consisting of ceramics, polytetrafluoroethylene, polyvinylidene fluoride, polyethersulfone, polyphenylene sulfide, polysulfone, polyimide, polypropylene, polyetherimide, and polyether ether ketone.

The thickness of the supply gas channel member 30, which is not particularly limited, is preferably in a range of 100 μM to 1000 μM, more preferably in a range of 150 μm to 950 μm, and still more preferably in a range of 200 μm to 900 μm.

<Method of Producing Spiral Type Module>

Next, a method of producing the acidic gas separation module having the above-described configuration will be described. FIGS. 8A to 8H are views for describing a process of producing the acidic gas separation module.

First, as illustrated in FIG. 8A, the tip portion of the long permeating gas channel member 6 is put inside a slit (not illustrated) provided in the axial direction of the pipe wall of the permeating gas collecting pipe 12. According to this configuration, even when the laminate 14 including the permeating gas channel member 6 is wound around the permeating gas collecting pipe 12 while tension is applied thereto, the permeating gas channel member 6 does not come out of the slit due to friction between the inner peripheral surface of the permeating gas collecting pipe 12 and the permeating gas channel member 6, that is, the fixation of the permeating gas channel member 6 is maintained. Further, in a case where the permeating gas collecting pipe 12 does not include a slit, the tip portion of the permeating gas channel member may be fixed to the pipe wall (outer peripheral surface) of the permeating gas collecting pipe 12 using a fixing member such as a Kapton tape or an adhesive.

Next, the gas separation film 10 formed by coating the porous support 4 obtained by laminating the porous film 2 and the auxiliary support film 3 on the facilitated transport film 5 is prepared, a supply gas channel member 30 is placed in a region which is half of the surface of the facilitated transport film 5 of the gas separation film 10 as illustrated in FIG. 8B, and the gas separation film 10 is folded into two in a direction of an arrow D as illustrated in FIG. 8C such that the supply gas channel member 30 is interposed between the facilitated transport films 5. Further, when the acidic gas separation film 10 is folded into two, the acidic gas separation film 10 may be divided into two as illustrated in FIG. 8C, but the film may be shifted and then folded.

As illustrated in FIG. 8C, after a leaf 50 in which the long supply gas channel member 30 is interposed between the long acid gas separation film 10 obtained by inwardly folding the facilitated transport film 5 is formed, four sides shown by the hatching of one surface 50a of the leaf in the figure are coated with the adhesive 8a using the brush 11 or the like. At this time, the adhesive 8a passes through the mesh of the auxiliary support film 3 without remaining in the mesh at the time of application and has become impregnated into the pores of the porous film 2 by adjusting the viscosity of the adhesive 8a to be relatively low. The adhesive 8a remains in the pores of the porous film 2 without being impregnated into the facilitated transport film 5 (see FIG. 8D).

As illustrated in FIG. 8D, after the adhesive 8a becomes impregnated into the porous film 2 of the one surface 50b side of the leaf 50, three sides from which a folded portion 51 of the one surface 50a (surface of the auxiliary support film 3 of the porous support 4) of the leaf 50 is removed is coated with the adhesive 8b as illustrated in FIG. 8E. The viscosity of the adhesive 8b is adjusted to be higher than that of the adhesive 8a used for application of the adhesive previously. The adhesive 8b may be applied appropriately using the method described in the first embodiment. Further, the application width of the adhesive 8b is set to be smaller than that of the adhesive 8a.

Next, as illustrated in FIG. 8F, the leaf 50 is placed on the surface of the permeating gas channel member 6 fixed to the permeating gas collecting pipe 12 such that the leaf 50 is brought into contact with the surface 50a coated with the adhesive 8b. At this time, the folded portion 51 of the leaf 50 which is not coated with the adhesive 8b is set to be the gas collecting pipe 12 side.

Next, as illustrated in FIG. 8G, in the same manner as described above, four sides shown by the hatching of another surface 50b of the leaf 50 adhered to the permeating gas channel member 6 in the figure are coated with the adhesive 8a using the brush 11 or the like. At this time, the adhesive 8a passes through the mesh of the auxiliary support film 3 without remaining in the mesh at the time of application and becomes impregnated into the pores of the porous film 2 as illustrated in FIG. 8H. The adhesive 8a remains in the pores of the porous film 2 without being impregnated into the facilitated transport film 5.

FIG. 8I is an enlarged view of the section taken along the line 8I-8I in FIG. 8H. When an area from the one surface 50a and another surface 50b of the leaf 50 to the folded portion 51 is coated with the adhesive 8a, the adhesive 8a becomes impregnated into the porous film 2 of the folded portion 51 of the gas separation film 10 at an impregnation rate of 10% or greater, and the film protection unit 19 in which the impregnation rate of the adhesive in the auxiliary support film 3 is smaller than the impregnation rate of the adhesive in the porous film 2 is formed. As described above, the film protection unit 19 is not provided adjacent to the sealing unit. The film protection unit 19 prevents the facilitated transport film 5 in the folded portion from being damaged and prevents leakage of gas in a case where damage occurs.

As illustrated in FIG. 8I, damage or a defect 5a tends to occur in the facilitated transport film 5 at a portion in which the center of the folded portion of the gas separation film 10 is brought into contact with the corners of the supply gas channel member 30. When damage or a defect occurs in the facilitated transport film 5, there is a concern that supply gas may be mixed into the permeating gas channel member side due to the damage or the defect. However, as described in the embodiment, since the porous film 2 of the folded portion includes the film protection unit 19 into which the adhesive 8a becomes impregnated, it is possible to prevent the supply gas from leaking to the permeating gas channel member side after permeating into the separation film 10.

Next, three sides of the peripheral edge of another surface 50b of the leaf 50 attached to the permeating gas channel member 6 are coated with the adhesive 8b in the same manner as described above.

Figure 9:
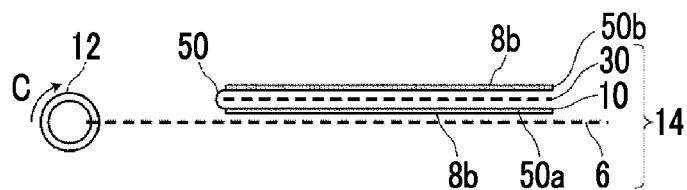
FIG. 9 is a view illustrating the process of producing the spiral type module continuing after FIG. 8H.

Subsequently, as schematically illustrated in FIG. 9, the permeating gas channel member 6 is wound around the permeating gas collecting pipe 12 so as to cover the through-holes 12A by allowing the permeating gas collecting pipe 12 to rotate in an arrow C direction, and the leaf 50 is further wound around the permeating gas channel member 6. At this time, when tension is applied to the film direction, the sealing unit 7 is formed by the adhesive 8b, which is applied to one surface 50a of the leaf 50, permeating into the channel member 6 and the porous support 4 and the sealing unit 7 is formed by the adhesive 8b, which is applied to another surface 50b of the leaf 50, permeating into the permeating gas channel member 6 and the porous support 4. In this manner, as illustrated in FIG. 7, a spiral module including the sealing unit 7 formed by the adhesive 8b permeating into the both end portions of the collecting pipe 12 in the length direction and the film protection unit 9 adjacent to the sealing unit 7 which is formed by the permeation of the adhesive 8a can be obtained.

Figure 10:
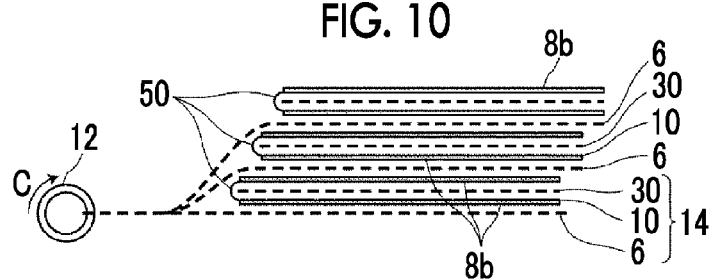
FIG. 10 is a view illustrating a modification example of the process of producing the spiral type module.

Plural sheets of leaves 50 in which the acidic gas separation film 10 is folded into two and the supply gas channel member 30 is interposed therebetween and plural sheets of permeating gas channel members 6 are alternately laminated on each other. As a result, the plural laminates 14 overlap each other as illustrated in FIG. 10 and then may be wound around the permeating gas collecting pipe multiple times. In addition, in the case where the plural laminates overlap each other, it is preferable that the laminates overlap so as to be slightly shifted from each other as illustrated in FIG. 10 such that differences between levels after the laminate is wound around the collecting pipe do not become large.

A cylindrical wound body is obtained by performing the above-described process, trimming (end surface modifying process) is performed on both end portions of the obtained cylindrical wound body, the outermost periphery of the cylindrical wound body is covered by the coating layer 16, and the telescope prevention plate 18 is attached to both ends thereof, thereby obtaining the acidic gas separation module 100 illustrated in FIG. 5.

In the embodiment of the spiral module, the film protection unit 19 is formed in the folded portion 51 of the leaf 50, but the film protection unit 19 is not necessarily included when the folded portion 51 is protected by adhering a Kapton tape thereto. In a case where the film protection unit 19 is not included in the folded portion 51, in the production method described above, three sides from which the folded portion 51 is removed may be coated with the adhesive 8a applied to four sides of the leaf 50. However, when the film protection unit 19 is included, the separation precision can be further increased, which is preferable (see Examples described below).

<Flat Film Type Acidic Gas Separation Module>

Figure 11:
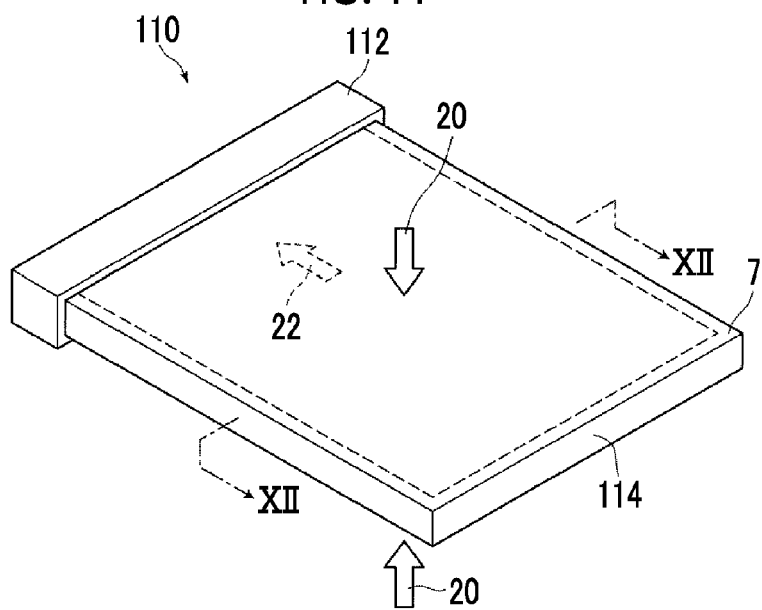
FIG. 11 is a perspective view schematically illustrating a flat surface type module according to an embodiment of the present invention.
Figure 12:
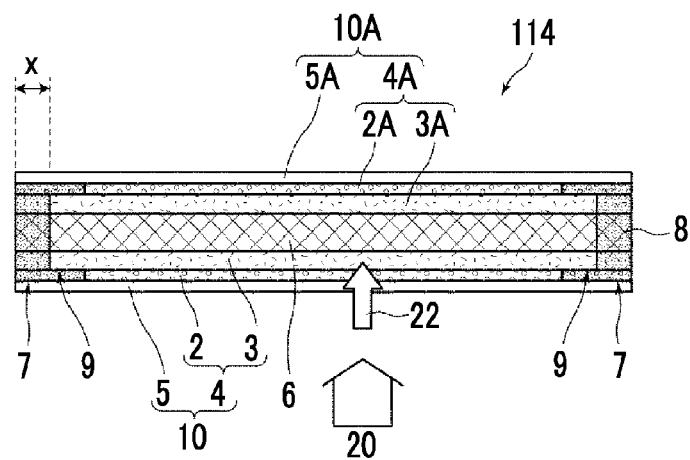
FIG. 12 is a sectional view taken along the line XII-XII of the flat surface type module illustrated in FIG. 11.

FIG. 11 is a perspective view schematically illustrating a flat film type acidic gas separation module 110 (hereinafter, referred to as a flat film type module 110) which is a second embodiment of the acidic gas separation module of the present invention and FIG. 12 is a sectional view taken along the line XII-XII of FIG. 11.

As illustrated in FIGS. 11 and 12, the flat film type module 110 includes a permeating gas collecting pipe 112 and a laminate 114 including separation films 10 and 10A on both surfaces of the permeating gas channel member 6.

The laminate 114 is an embodiment of the acidic gas separation laminate of the present invention and includes the porous support 4 formed by laminating the porous film 2 and the auxiliary support film 3, the acidic gas separation film 10 formed of the acidic gas separation facilitated transport film 5 including an acidic gas carrier that is disposed on the porous film 2 side of the porous support 4 and reacts with at least a hydrophilic compound and acidic gas in raw material gas, and a permeating gas channel member 6 which is disposed on the auxiliary support film 3 side of the porous support 4 and in which the acidic gas having permeated and passed through the acidic gas separation facilitated transport film 5 flows by reacting with the acidic gas carrier. In addition, in the embodiment, one more acidic gas separation film 10A interposing the permeating gas channel member 6 and facing the acidic gas separation film 10 may be included. Here, the acidic gas separation film 17 including the intermediate layer 15 between the porous support 4 and the facilitated transport film 5 may be used in place of the acidic gas separation films 10 and 10A.

Further, the laminate includes the sealing unit 7 formed by the adhesive 8 permeating into the porous film 2, the auxiliary support film 3, and the permeating gas channel member 6 in the lamination direction at a width of 5 mm or greater in the peripheral edge of the laminate 114 and the film protection unit 9 formed in a state of being adjacent to the sealing unit 7. The sealing unit 7 and the film protection unit 9 are provided on three sides from the peripheral edge of the laminate 114 and one side which is not provided with the sealing unit 7 and the film protection unit 9 is connected to the permeating gas collecting pipe 112. The permeating gas permeating into the acidic gas separation films 10 and 10A passes through the inside region surrounded by the sealing unit 7 of the permeating gas channel member 6 and flows into the permeating gas collecting pipe 112.

The flat film type module 110 is arranged in a container to which raw material gas is supplied. Further, the acidic gas 22 in the raw material gas 20 reacts with a carrier of the facilitated transport film 5, is taken into the laminate 114, permeates and passes through the facilitated transport film 5 and the porous support 4, passes through the permeating gas channel member 6, is accumulated in the permeating gas collecting pipe 112, and recovered by a gas exhaust port (not illustrated) connected to the permeating gas collecting pipe 112.

Since the flat film type module of the embodiment includes the laminate 114 and the film protection unit 9 in a state of being adjacent to the sealing unit 7, it is possible to prevent the facilitated transport film 5 from being damaged due to stress concentration occurring in the interface between the sealing unit 7 and a portion other than the sealing unit. Further, even when damage is generated, it is possible to prevent raw material gas from permeating into the permeating gas channel member 6 side from the damaged region of the facilitated transport film 5.

EXAMPLES

Hereinafter, the present invention will be described in detail with reference to Examples. Further, the materials, the amounts used, the proportions, the treatment details, and the treatment procedures shown in Examples below can be appropriately changed within a range not departing from the scope of the present invention. Accordingly, the range of the present invention should not be limitatively interpreted by the specific examples described below.

Example 1

As a porous support formed of a laminated film of a porous film and an auxiliary support film, PTFE/PP unwoven fabric (manufactured by General Electric Company) was used. The thickness of the PTFE was approximately 30 μm and the thickness of the PP unwoven fabric was approximately 200 μm.

(Preparation of Coating Solution Composition of Carbon Dioxide Separation Facilitated Transport Film)

1 M hydrochloric acid was added to an aqueous solution containing 3.3% by mass of a polyvinyl alcohol polyacrylic acid copolymer KURASTOMER AP20 (manufactured by KURARAY CO., LTD.) and 0.016% by mass of a 25% glutaraldehyde aqueous solution (manufactured by Wako Pure Chemical Industries, Ltd.) such that cross-linking occurred, and a 40% cesium carbonate (manufactured by Kisan Kinzoku Chemicals Co., Ltd.) aqueous solution serving as a carrier was added thereto such that the concentration of the cesium carbonate became 6.0% by mass. Further, 1% RAPISOL A-90 (manufactured by NOF CORPORATION) was added thereto such that the concentration thereof became 0.004% by mass, the temperature was increased, and the mixture was stirred in order to allow degassing, thereby obtaining a coating composition.

The PTFE film of the PTFE/PP unwoven fabric was coated with the coating composition and dried, and then a separation film was formed.

As a supply gas channel member, a polypropylene net having a thickness of 0.44 mm was interposed between separation film obtained by inwardly folding the carbon dioxide separation film surface into two. The portion folded into two was reinforced by a Kapton tape. A fold was firmly folded such that the film surface was not damaged and a leaf was formed in a manner in which curls were not generated.

A process of placing a leaf whose three sides of the peripheral edge of one surface were coated with an adhesive having a relatively low viscosity, using a brush, at a predetermined position on a permeating gas channel member formed of polypropylene fabric which was fixed to a collecting pipe via a partition and had a width of 0.5 mm such that the one surface was brought into contact with the permeating gas channel member and which was coated with an adhesive having relatively high viscosity, similarly coating another surface of the leaf placed on the channel member with the adhesive to have a U shape in the same manner as described above, placing a new permeating gas channel member thereon, and placing a new leaf coated with the adhesive was repeatedly performed, the number of laminated units, each of which is formed of a combination of one leaf and one sheet of permeating gas channel member, was set as 3, and the laminate was wound around the collecting pipe. Here, an epoxy resin whose viscosity was adjusted was used as an adhesive. The viscosity of the adhesive which was initially applied and had a relatively low viscosity was set as 10 mPa·s and the viscosity of the adhesive which was applied later and had a relatively high viscosity was set as 940 Pa·s. An adhesive (E120HP, manufactured by Henkel Japan Ltd., Tokyo) formed of an epoxy resin was used as the adhesive having a relatively high viscosity and a mixture of 50 parts by mass of the adhesive (E120HP, manufactured by Henkel Japan Ltd., Tokyo) formed of an epoxy resin and 50 parts by mass of acetone was used as the adhesive having a relatively low viscosity.

Both ends were aligned by a side cut, a PPS (including 40% glass) telescoping prevention plate was attached thereto, and the periphery thereof was reinforced by fiber reinforced plastic (FRP), thereby obtaining a spiral type separation film module. The design film area of the spiral type separation film module of Example 1 was set to 1.2 m². Further, according to a measurement method described below, the sealing width of the sealing unit was 10 mm and the width of the film protection unit from the end portion was 50 mm. For the impregnation rate of the adhesive in the film protection unit, this was 28% for the porous film, 10% for the auxiliary support film, and 10% for the permeating gas channel member.

Modules of Examples 2 to 6 and Comparative Examples 1 and 2 were respectively prepared in the same manner as in Example 1 except that the numbers of laminated units, the film areas (design), the sealing widths, the widths of the film protection unit, the formation positions of the film protection unit, and the impregnation rates of the adhesive in the film protection unit were set as in Table 2 below. Further, the expression "the formation position of the film protection unit is three sides" in Table 2 means that the film protection unit is not present in the folded unit of the leaf and "the formation position of the film protection unit is four sides" means that the film protection unit is present in the folded unit of the leaf. In Comparative Example 1, the film protection unit was not provided.

Example 7

In Example 1, a laminate including an intermediate layer between the porous film and the facilitated transport film was prepared as a sample of Example 7.

An intermediate layer coating solution used for forming an intermediate layer was prepared by adding 4-isopropyl-4'-methyldiphenyliodonium tetrakis(pentafluorophenyl)borate (manufactured by TOKYO CHEMICAL INDUSTRY CO., LTD.) as a curing agent to epoxy-modified polydimethylsiloxane (KF-102, manufactured by Shin-Etsu Chemical Co., Ltd.) which is a silicone resin. At this time, 0.5% by weight of a curing agent was added to 100 of a silicone resin. The surface of the porous support was coated with this intermediate layer coating solution using a roll-to-roll system, ultraviolet rays were applied by a curing device to cure the intermediate layer coating solution, and an intermediate layer formed of a silicone resin was formed in the support. The coating solution composition of the carbon dioxide separation facilitated transport film was applied to the support including the intermediate layer and then an acidic gas separation laminate of Example 7 was obtained.

adhesive in the porous film 2 was 10% or greater and in which the impregnation rates of the adhesive in the auxiliary support film and the permeating gas channel member were smaller than the impregnation rate of the adhesive in the porous film 2 was set as a film protection unit, and then the width of the sealing unit and the width of the film protection unit were acquired. The average value of the widths of the sealing unit in three sections, the widths of the film protection unit, and the impregnation rates of the adhesive in the film protection unit were respectively set as the width of the sealing unit of the

TABLE 2

|  | Number of laminated units | Film area (design) | Sealing width | Width of film protection unit | Formation position of film protection unit | Intermediate layer | Impregnation rate of adhesive in film protection unit |
|---|---|---|---|---|---|---|---|
| Example 1 | 3 | 1.2 | 10 | 50 | Three sides | — | 28 |
| Example 2 | 3 | 1.2 | 10 | 50 | Three sides | — | 13 |
| Example 3 | 3 | 1.2 | 10 | 50 | Three sides | — | 61 |
| Example 4 | 3 | 1.2 | 10 | 50 | Four sides | — | 26 |
| Example 5 | 3 | 1.2 | 10 | 50 | Four sides | — | 88 |
| Example 6 | 20 | 30 | 10 | 50 | Four sides | — | 86 |
| Example 7 | 3 | 1.2 | 10 | 50 | Three sides | Present | 53 |
| Comparative Example 1 | 3 | 1.2 | 10 | — | — | — | 0 |
| Comparative Example 2 | 3 | 1.2 | 10 | 50 | Three sides | — | 6 |

Comparative Example 2 is an example in which a region which is adjacent to the sealing unit and in which the impregnation rate of the adhesive in the porous film is less than 10% is included, the region does not correspond to the film protection unit, and the film protection unit is not included in the same manner as in Comparative Example 2. In this case, in Comparative Example 2, the width of a region in which the impregnation rate of the adhesive in the porous film was less than 10% and the impregnation rate of the adhesive are listed in columns of the width of the film protection unit and the impregnation rate of the adhesive in Table 2 for the sake of convenience.

[Evaluation of Carbon Dioxide Separation Spiral Module]

The following evaluation was performed on obtained carbon dioxide separation spiral modules of Examples and Comparative Examples and the results thereof were listed in Tables 2 and 3.

<Sealing Width, Width of Film Protection Unit, and Impregnation Rate of Adhesive>

After module factor evaluation was performed, a module was disassembled, a sealed portion was subjected to freeze-fracture to take a section out, the section was observed using a scanning electron microscope (SEM), and the width of the sealing unit and the width of the film protection unit were measured. Specifically, sections were taken out in three different places in a specific side other than the folded unit of the leaf from the three sides or the four sides in each laminate, the impregnation rate of the adhesive from the filling area of the adhesive to the area of pores in respective units of the porous film, the auxiliary support film, and the permeating gas channel member was acquired by performing image processing on respective sections for each area having a width of 0.01 mm from the end portion of the laminate, a portion in which the impregnation rate of the adhesive in the porous film was 60% or greater and the respective impregnation rates of the adhesive in the auxiliary support film and the permeating gas channel member were greater than or equal to the impregnation rate of the adhesive in the porous film was set as a sealing unit, and a portion in which the impregnation rate of the module, the width of the film protection unit, and the impregnation rate of the adhesive in the film protection unit. The results thereof are listed in Table 2.

In Table 2, the impregnation rate of the adhesive in the film protection unit is the impregnation rate of the adhesive in the porous film of the film protection unit.

<Module Factor>

The module factors of the prepared carbon dioxide separation modules according to Examples and Comparative Examples, an acidic gas separation module, and an acidic gas separation facilitated transport film on a porous support used in a module were evaluated and calculated under the following conditions.

(Measuring Separation Factor of Acidic Gas Separation Module)

Condition 1; Raw material gas (flow rate: 2.2 L/min) having a ratio of "$H_2:CO_2:H_2O=45:5:50$" was supplied to respective carbon dioxide separation modules as a supply gas at a temperature of 130° C. and at a total pressure of 301.3 kPa and Ar gas (flow rate: 0.9 L/min) was allowed to flow into the permeation side. The permeating gas was analyzed by gas chromatography and a $CO_2/H_2$ separation factor ($\alpha$) was calculated.

Condition 2; Raw material gas (flow rate: 1.72 L/min) having a ratio of "$N_2:CO_2:H_2O=66:21:13$" was supplied to respective carbon dioxide separation modules as a supply gas at a temperature of 130° C. and at a total pressure of 2001.3 kPa. The permeating gas was analyzed by gas chromatography and a $CO_2/N_2$ separation factor ($\alpha$) was calculated.

(Measuring Separation Factor of Acidic Gas Separation Facilitated Transport Film on Porous Support)

Condition 1; Raw material gas (flow rate: 0.32 L/min) having a ratio of "$H_2:CO_2:H_2O=45:5:50$" was supplied to respective carbon dioxide separation films as a supply gas at a temperature of 130° C. and at a total pressure of 301.3 kPa and Ar gas (flow rate: 0.04 L/min) was allowed to flow into the permeation side. The permeating gas was analyzed by gas chromatography and a $CO_2/H_2$ separation factor ($\alpha$) was calculated.

Condition 2; Raw material gas (flow rate: 0.32 L/min) having a ratio of "$N_2:CO_2:H_2O=66:21:13$" was supplied to respective carbon dioxide separation films as a supply gas at a temperature of 130° C. and at a total pressure of 2001.3 kPa. The permeating gas was analyzed by gas chromatography and a $CO_2/N_2$ separation factor ($\alpha$) was calculated.

The module factor was calculated based on the following equation related to Conditions 1 and 2.

Module factor=$\alpha$ of acidic gas separation module/$\alpha$ of acidic gas separation facilitated transport film on porous support

TABLE 3

|  | Module factor | |
| --- | --- | --- |
|  | Condition 1 | Condition 2 |
| Example 1 | 0.56 | 0.39 |
| Example 2 | 0.43 | 0.31 |
| Example 3 | 0.87 | 0.61 |
| Example 4 | 0.62 | 0.49 |
| Example 5 | 0.93 | 0.73 |
| Example 6 | 0.79 | 0.55 |
| Example 7 | 0.73 | 0.69 |
| Comparative Example 1 | 0.11 | 0.04 |
| Comparative Example 2 | 0.23 | 0.09 |

From Tables 2 and 3, it was confirmed that a higher module factor was shown when the film protection unit was formed compared to Comparative Example 1 in which the film protection unit was not formed. It is obvious that the module factor is increased and the separation performance is improved when the impregnation rate of the adhesive in the film protection unit is higher. While a module factor of 0.43 was obtained under Condition 1 even when the impregnation rate of the adhesive of the film protection unit was 13% as in Example 2, the module factor was 0.23, which was low, when the impregnation rate of the adhesive in the film protection unit was 6% as in Comparative Example 2. From the results of Examples 1 to 3 and Condition 1 of Comparative Example 2, it can be assumed that a module factor of approximately 0.3 is obtained under Condition 1 when the impregnation rate is approximately 10%. In addition, for the purpose of obtaining a module factor of 0.5 or greater under Condition 1, it is obvious that the impregnation rate of the adhesive in the film protection unit is preferably 25% or greater, more preferably 60% or greater, and still more preferably 80% or greater. In addition, the impregnation rate of the adhesive in the film protection unit in Example 1 is substantially the same as that of Example 4, but a higher module factor can be obtained when the film protection unit is formed on four sides as in Example 4, that is, the film protection unit is included in the folded unit of the leaf. For this reason, it can be assumed that defects of the separation film in the end portion of the supply gas channel member or in the folded unit can be prevented or gas inflow from defects can be prevented. In addition, in Examples of the present invention, a high module factor (0.3 or greater) was realized even in a case where great stress was applied to a film as in Condition 2.

Even when the permeation rate of the film protection unit was high as in Example 5, the film protection unit functioned sufficiently well and a high module factor (0.3 or greater) was realized. The reason for this can be assumed that generation of defects caused by stress concentration can be suppressed even when a large amount of adhesive becomes impregnated. Further, effects as the film protection unit can be exhibited without any problems even in a module in which the number of leaves is higher as in Example 6. It is assumed that when the number of leaves is higher, the module becomes larger, and thus film protection performance can be sufficiently exhibited even when a force for winding up is strong. The film protection unit effectively functions even in a case where an intermediate layer is provided in the acidic gas separation laminate as in Example 7 and a high module factor is shown. The reason for this can be assumed that defects are not generated by introducing the film protection unit and gas separation performance is exhibited even in a case where an intermediate layer used for improving flat film performance is introduced.

Furthermore, in Conditions 1 and 2, it was confirmed that the module factor was extremely low in a case where a film protection unit was not included as in Comparative Example 1.

What is claimed is:

1. An acidic gas separation laminate comprising:
   a composite film formed of a porous support which is formed by laminating a porous film and an auxiliary support film, a carrier which is disposed on the porous film side of the porous support and reacts with acidic gas in raw material gas, and an acidic gas separation facilitated transport film which contains a hydrophilic compound carrying the carrier;
   a permeating gas channel member which is laminated so as to face the auxiliary support film of the porous support and in which acidic gas permeated and passed through the composite film flows; and
   a film protection unit in which an adhesive becomes impregnated into the porous film at an impregnation rate of 10% or greater in a lamination direction of the porous support and an auxilliary impregnation rate of the adhesive in the auxiliary support film is smaller than the impregnation rate of the adhesive in the porous film.

2. The acidic gas separation laminate according to claim 1, further comprising:
   a sealing unit which is formed by impregnating the porous film with the adhesive along the peripheral edge of the laminate at a porous film sealing unit impregnation rate of 60% or greater and
   formed by impregnating the auxiliary support film and the permeating gas channel member with the adhesive such that their respective impregnation rates become greater than or equal to the porous film sealing unit impregnation rate,
   wherein the film protection unit is formed in a state of being adjacent to the sealing unit.

3. The acidic gas separation laminate according to claim 1, further comprising:
   a supply gas channel member which is disposed between the acidic gas separation facilitated transport film of the composite film that is obtained by inwardly folding the acidic gas separation facilitated transport film into two in the length direction,
   wherein a portion of the film protection unit overlaps a portion of the acidic gas separation facilitated transport film which contacts an end portion of the supply gas channel member.

4. The acidic gas separation laminate according to claim 1, wherein the porous film is formed of a fluorine-based resin material.

5. The acidic gas separation laminate according to claim 4, wherein the porous film is formed of polytetrafluoroethylene.

6. The acidic gas separation laminate according to claim 1, wherein the adhesive is formed of an epoxy resin.

7. The acidic gas separation laminate according to claim 1, further comprising an intermediate layer between the porous film and the acidic gas separation facilitated transport film.

8. The acidic gas separation laminate according to claim 7, wherein the intermediate layer is a silicone resin layer.

9. An acidic gas separation module comprising:
 a permeating gas collecting pipe; and
 the acidic gas separation laminate according to claim 1.

10. The acidic gas separation module according to claim 9, which is a spiral type module.

11. The acidic gas separation module according to claim 9, which is a flat film type module.

* * * * *

UNITED STATES PATENT AND TRADEMARK OFFICE
CERTIFICATE OF CORRECTION

PATENT NO. : 9,452,384 B2
APPLICATION NO. : 15/007985
DATED : September 27, 2016
INVENTOR(S) : Narita et al.

It is certified that error appears in the above-identified patent and that said Letters Patent is hereby corrected as shown below:

On the Title Page

Insert Item (30):
-- Jul. 30, 2013 (JP) ............ 2013-157550
Jul. 25, 2014 (JP) ............ 2014-151934 --.

Signed and Sealed this
Third Day of January, 2017

Michelle K. Lee
*Director of the United States Patent and Trademark Office*